United States Patent
Bhat et al.

(10) Patent No.: US 12,524,036 B2
(45) Date of Patent: Jan. 13, 2026

(54) CLOCK MONITORING SUBSYSTEM FOR SUPPORTING DYNAMIC FREQUENCY SCALING AND CLOCK GATING

(71) Applicant: QUALCOMM Incorporated, San Diego, CA (US)

(72) Inventors: Vanamali Bhat, Bangalore (IN); Amod Phadke, Bangalore (IN); Sina Dena, San Diego, CA (US); Michael Tipton, Midlothian, VA (US); Amit Aneja, Chandler, AZ (US); Prachin Sheshrao Bhoyar, Nagpur (IN)

(73) Assignee: QUALCOMM Incorporated, San Diego, CA (US)

( * ) Notice: Subject to any disclaimer, the term of this patent is extended or adjusted under 35 U.S.C. 154(b) by 113 days.

(21) Appl. No.: 18/509,245

(22) Filed: Nov. 14, 2023

(65) Prior Publication Data
US 2025/0155916 A1    May 15, 2025

(51) Int. Cl.
    *G06F 1/08*    (2006.01)
    *B60W 50/06*    (2006.01)
(52) U.S. Cl.
    CPC .............. *G06F 1/08* (2013.01); *B60W 50/06* (2013.01)
(58) Field of Classification Search
    CPC .................. G06F 1/08; G06F 1/10; G06F 1/12
    See application file for complete search history.

(56) References Cited

U.S. PATENT DOCUMENTS

| | | | | |
|---|---|---|---|---|
| 7,236,028 B1 * | 6/2007 | Choi | ...................... | H03L 7/0814 |
| | | | | 327/158 |
| 7,242,223 B1 * | 7/2007 | Alon | .................... | G04D 7/1207 |
| | | | | 327/39 |
| 7,664,979 B2 * | 2/2010 | Lai | .......................... | G09G 5/008 |
| | | | | 345/204 |
| 8,760,136 B2 * | 6/2014 | Lee | .......................... | G05F 1/10 |
| | | | | 323/283 |
| 10,514,401 B2 * | 12/2019 | Duggal | ................ | G01R 35/005 |
| 11,327,525 B1 * | 5/2022 | Salluzzo | ................... | G06F 1/08 |
| 2005/0289369 A1 | 12/2005 | Chung et al. | | |

FOREIGN PATENT DOCUMENTS

WO    2022132467 A1    6/2022

OTHER PUBLICATIONS

International Search Report and Written Opinion—PCT/US2024/050251—ISA/EPO—Jan. 10, 2025.
Kogan T., et al., "Advanced Uniformed Test Approach For Automotive SoCs", 2018 IEEE International Test Conference (ITC), IEEE, Oct. 29, 2018, pp. 1-10, XP033508922, paragraph [0001] paragraph [02.1] paragraph [05.1].

* cited by examiner

*Primary Examiner* — Raymond N Phan
(74) *Attorney, Agent, or Firm* — Seyfarth Shaw LLP

(57) ABSTRACT

A method for a clock monitoring subsystem of a system-on-chip (SoC) supporting dynamic clock scaling and voltage gating is described. The method includes generating a set of clocks. The method also includes routing a selected one of the set of clocks for frequency measurement through one or more clock routing subsystems. The method further includes adjusting a frequency of the selected clock after the selected clock is routed through the clock routing subsystems. The method also includes communicating a sideband signal to indicate the adjusted frequency of the selected clock.

17 Claims, 15 Drawing Sheets

CLOCK MONITORING SUBSYSTEM FOR SUPPORTING DYNAMIC FREQUENCY SCALING AND CLOCK GATING

BACKGROUND

Field of the Disclosure

Aspects of the present disclosure relate to clock monitoring units, and in particular, to a clock monitoring subsystem for system-on-chip (SoC) supporting dynamic clock scaling and voltage gating.

Background

Vehicle or automotive control systems may be subjected to more stringent electrical operational requirements. This is because errors in such vehicle or automotive control systems may result in severe injury or death to humans occupying associated vehicles, as well as humans, animals, and property that may collide with such vehicles. Such stringent electrical operational requirements may address system redundancy, greater resistance to electrical and software faults, and improved monitoring of such systems, to name a few issues. One subcomponent of such systems that is of interest is a clock generator that produces timing signals, also commonly referred to as "clock signals," or simply referred to as "clocks" to drive various signal processing cores of an integrated circuit (IC) or system on chip (SoC).

SUMMARY

A method for a clock monitoring subsystem of a system-on-chip (SoC) supporting dynamic clock scaling and voltage gating is described. The method includes generating a set of clocks. The method also includes routing a selected one of the set of clocks for frequency measurement through one or more clock routing subsystems. The method further includes adjusting a frequency of the selected clock after the selected clock is routed through the clock routing subsystems. The method also includes communicating a sideband signal to indicate the adjusted frequency of the selected clock.

A non-transitory computer-readable medium having program code recorded thereon for a clock monitoring subsystem of a system-on-chip (SoC) supporting dynamic clock scaling and voltage gating is described. The program code is executed by a processor. The non-transitory computer-readable medium includes program code to generate a set of clocks. The non-transitory computer-readable medium also includes program code to route a selected one of the set of clocks for frequency measurement through one or more clock routing subsystems. The non-transitory computer-readable medium further includes program code to adjust a frequency of the selected clock after the selected clock is routed through the clock routing subsystems. The non-transitory computer-readable medium also includes program code to communicate a sideband signal to indicate the adjusted frequency of the selected clock.

A vehicle system is described. The vehicle system includes a vehicle control subsystem. The vehicle system also includes a set of one or more digital signal processing cores coupled to the vehicle control subsystem. The vehicle system further includes a set of clock generators to generate a set of clocks, in which the set of clock generators are coupled to the set of one or more digital signal processing cores. The vehicle system also includes one or more clock routing subsystems in which a selected one of the set of clocks is routed for frequency measurement. The vehicle system further includes a clock monitoring unit to adjust a frequency of the selected clock after the selected clock is routed through the clock routing subsystems and to communicate a sideband signal to indicate the adjusted frequency of the selected clock.

This has outlined, broadly, the features and technical advantages of the present disclosure in order that the detailed description that follows may be better understood. Additional features and advantages of the present disclosure will be described below. It should be appreciated by those skilled in the art that this present disclosure may be readily utilized as a basis for modifying or designing other structures for conducting the same purposes of the present disclosure. It should also be realized by those skilled in the art that such equivalent constructions do not depart from the teachings of the present disclosure as set forth in the appended claims. The novel features, which are believed to be characteristic of the present disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

For a more complete understanding of the present disclosure, reference is now made to the following description taken in conjunction with the accompanying drawings.

DETAILED DESCRIPTION

Figure 1:
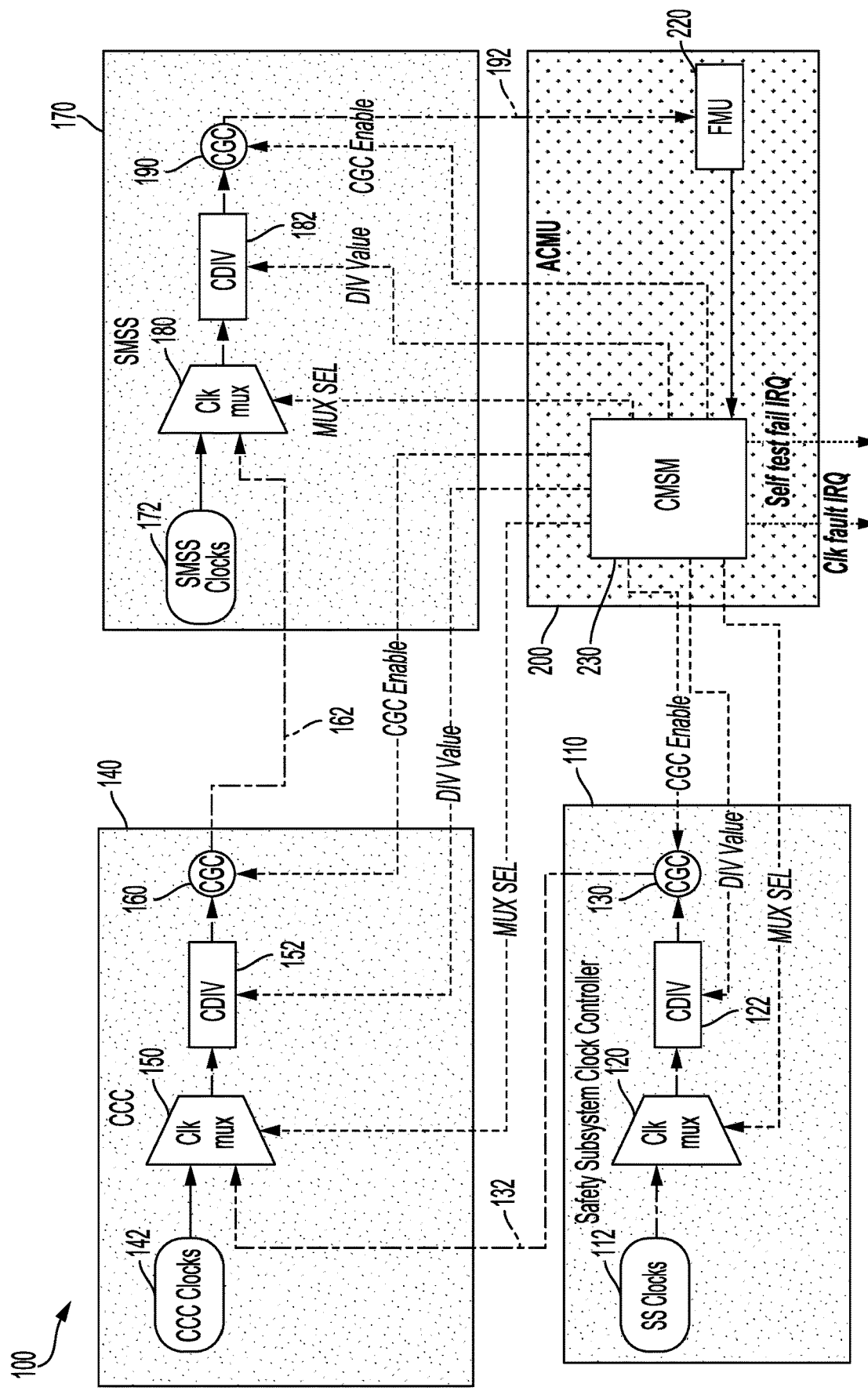
FIG. 1 is a block diagram illustrating a system on chip (SoC), in accordance with various aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. It will be apparent, however, to those skilled in the art that these concepts may be practiced without these specific details. In some instances, well-known structures and components are shown in block diagram form in order to avoid obscuring such concepts.

As described herein, the use of the term "and/or" is intended to represent an "inclusive OR." and the use of the term "or" is intended to represent an "exclusive OR." As described herein, the term "exemplary" used throughout this description means "serving as an example, instance, or illustration." and should not necessarily be construed as preferred or advantageous over other exemplary configurations. As described herein, the term "coupled" used throughout this description means "connected, whether directly or indirectly through intervening connections (e.g., a switch), electrical, mechanical, or otherwise." and is not necessarily limited to physical connections. Additionally, the connections can be such that the objects are permanently connected or releasably connected. The connections can be through switches. As described herein, the term "proximate" used throughout this description means "adjacent, very near, next to, or close to." As described herein, the term "on" used throughout this description means "directly on" in some configurations, and "indirectly on" in other configurations.

Electronic circuits designed for vehicle or automotive control, or other safety-related applications, may be prescribed with more stringent specifications. These stringent specifications are prescribed because faults in automotive control circuits may result in severe injury or death to humans. There are governmental organizations that prescribe the specifications of electronic circuits for automotive control and other safety-related applications including the International Organization for Standardization (ISO) and the International Electrotechnical Commission (IEC).

For example, the ISO has prescribed an international standard ISO 26262 entitled "Road vehicles-Functional safety," which provides specifications for functional safety of electrical and/or electronic systems in serial production road vehicles. The IEC has prescribed an international standard IEC 61508 entitled "Functional Safety of Electrical/Electronic/Programmable Electronic Safety-related Systems," which outlines methods on how to apply, design, deploy, and maintain automatic protection systems called safety-related systems. In both ISO 26262 and IEC 61508, their specifications state that certain safety-related systems be continuously monitored during runtime in order to ensure proper operations.

This continuous monitoring specification also includes continuously monitoring clocks that drive data processing cores of a system on chip (SoC) used in an automotive control or other safety-related systems. As described, "clocks," also commonly referred to as "clock signals," are timing signals that drive various operations in an SoC, such as data processing, data transmission, etc. An integrated circuit (IC) or SoC may employ a clock monitoring unit (CMU) to measure the frequencies of the clocks and other related parameters and provide interrupts to an error management module (EMM) or a designated safety processor in the SoC. These devices respond to the clock fault interrupts and take measures to ensure the automotive control or safety-related systems operate safely considering the nature and characteristics of the interrupts. Such clock faults may include clock frequency drifting due to phase locked loop (PLL) jitter, a clock momentarily stopping, and a PLL losing its lock.

In practice, the CMU is configured and maintained by safety manager software that operates at a higher safety level compared to subsystem software that manages dynamic frequency scaling for subsystem clocks. Any frequency change without a communication between the subsystem hardware/software and the CMU results in the CMU reporting a clock fault. That is, communication between the subsystem hardware/software and the CMU is specified for supporting dynamic frequency scaling (DFS) based on a frequency change of the subsystem clocks. Software level communication between the subsystem software and the safety manager software is a higher latency process and involves significant software overhead. The latencies involved may violate the fault detection time interval (FDTI) levels, as defined in the ISO 26262 standard. There is a desire for a hardware communication-based solution for seamless transition of an automotive clock monitoring unit (ACMU) to different frequency monitoring nodes, without the software latencies, while honoring the FDTI specifications and with minimal hardware overhead.

Various aspects of the present disclosure are directed to a clock monitoring subsystem for system-on-chip (SoC) supporting dynamic clocks and scaling and voltage gating. According to various aspects of the present disclosure, a method for clock monitoring subsystem for system-on-chip (SoC) supporting dynamic clocks and scaling and voltage gating is described. The clock monitoring subsystem method includes generating a set of clocks. Once generated, a selected one of the set of clocks is routed for frequency measurement via one or more clock routing subsystems. The clock monitoring subsystem method adjusts a frequency of the selected clock after the selected clock has been routed through the clock routing subsystems. According to various aspects of the present disclosure, the clock monitoring subsystem method communicates a sideband signal to indicate the adjusted frequency of the selected clock for the automotive chips with clock monitoring.

FIG. 1 is a block diagram illustrating a system on chip (SoC) 100, in accordance with various aspects of the present disclosure. The SoC 100 may be used in an automotive control system or other type of safety-related system. The SoC 100 may include a set of subsystems (not shown) to perform various operations in accordance with the design specification for the SoC 100. For example, in the case of automotive control, the set of subsystems may include semiautonomous or autonomous driving subsystems (e.g., advanced driver assistance systems (ADAS)), such as forward collision warning (FCW), lane departure warning (LDW), blind spot detection (BSD) subsystems (e.g., ADAS level "0" subsystems); adaptive cruise control (ACC) and lane keep assist (LKA) subsystems (e.g., ADAS level "1" subsystems); ACC with lane keeping and traffic jam assist subsystems (e.g., ADAS level "2" subsystems); highway autopilot and traffic jam pilot subsystems (e.g., ADAS level "3" subsystems); full highway autopilot and full urban autopilot subsystems (e.g., ADAS level "+" subsystems);

and robo-taxi/shuttles and autonomous delivery fleet subsystems (e.g., ADAS level "5" subsystems).

In various aspects of the present disclosure, the SoC 100 further includes a safety subsystem clock controller 110, a central clock controller (CCC) 140, a safety monitor subsystem (SMSS) 170, and an automotive clock monitoring unit (ACMU) 200. The safety subsystem clock controller 110 includes safety subsystem (SS) clocks 112, a clock multiplexer (MUX) 120, a clock divider (CDIV) 122, and a clock gating control (CGC) 130. Similarly, the CCC 140 includes CCC clocks 142, a clock MUX 150, a clock divider (CDIV) 152, and a clock gating control (CGC) 160. Additionally, the SMSS 170 includes SMSS clocks 172, a clock MUX 180, a clock divider (CDIV) 182, and a clock gating control (CGC) 190.

In operation, a clock monitor state machine (CMSM) 230 of the ACMU 200 supplies respective CGC enabled signals, division (DIV) value signals, and MUX select (SEL) signals to control clock generation from the safety subsystem clock controller 110, the CCC 140, and the SMSS 170. In various aspects of the present disclosure, the safety subsystem clock controller 110 supplies a CGC input signal 132 to the clock MUX 150 of the CCC 140, and the CCC 140 supplies a CGC input signal 162 to the clock MUX 180 of the SMSS 170. In various aspects of the present disclosure, the SMSS 170 supplies a CGC input signal 192 to a frequency measurement unit (FMU) 220 of the ACMU 200.

The set of clock dividers 122/152/182 of the SoC 100 includes clock inputs coupled to the clock outputs of the set of clock multiplexers 120/150/180, respectively. The set of clock dividers 122/152/182 includes a set of clock divider value inputs configured to receive a divider value signal from a set of clock divider value outputs of the CMSM 230 to control the frequency divider ratio N of the set of clock dividers 122/152/182, respectively. The frequency divider ratio N is the frequency of the input clock to a clock divider divided by the frequency of the output clock of the clock divider. The set of clock dividers 122/152/182 is configured to frequency divide the selected clock so that the frequency of the clock provided to the ACMU 200 is within a prescribed limit. For example, the prescribed frequency limit of the clock applied to the ACMU 200 may be 200 megahertz (MHz). If, for example, a clock frequency is one (1) gigahertz (1 GHz), then the aggregate frequency division ratio of the set of clock dividers 122/152/182 should be five (5) or more.

The set of clock gating circuits (CGCs) 130/160/190 includes clock inputs coupled to clock outputs of the set of clock dividers 122/152/182, respectively. The set of clock gating circuits 130/160/190 includes a set of clock gate enabled inputs configured to receive the CGC enabled signal from the CMSM 230 to control the gating operation of the set of CGCs 130/160/190, respectively. For example, if the selected clock generated by the set of CGCs 130/160/190 for routing to the ACMU 200, the CGC enabled signal is configured to control the set of CGCs 130/160/190 to pass the selected clock and to block other respective input clocks so as not to unnecessarily consume clock power. The ACMU 200 includes the FMU 220, which receives a reference clock from the CGC 190 of the SMSS 170. The FMU 220 is configured to process the selected clock, or more specifically, measure a frequency of the selected clock based on the selected reference clock, and generate a value indicative of such frequency at a frequency measurement output coupled to an input of the CMSM 230. The ACMU 200 is further illustrated in FIG. 2, according to various aspects of the present disclosure.

Figure 2:
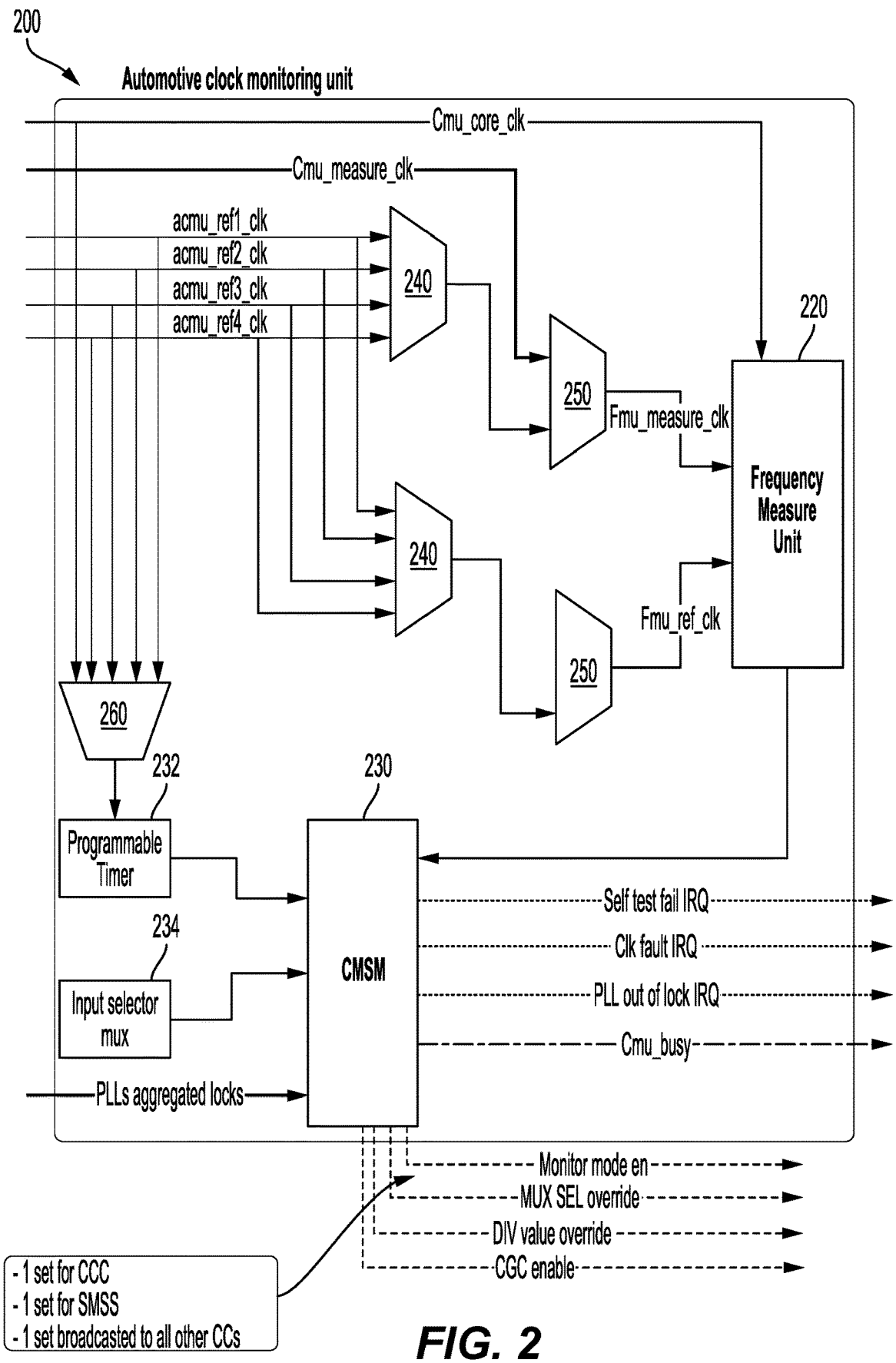
FIG. 2 is a block diagram further illustrating the automotive clock monitoring unit (ACMU) of FIG. 1, in accordance with various aspects of the present disclosure.

FIG. 2 is a block diagram further illustrating the ACMU 200 of FIG. 1, in accordance with various aspects of the present disclosure. The clock monitor state machine (CMSM) 230 is configured to control the operation of the frequency measurements of the clocks in accordance with, for example, a software (SW) configuration received from an SW configuration processor (not shown in FIG. 2). For example, for a particular measurement cycle, the SW configuration may provide the CMSM 230 information such as which clock(s) to measure (MUX SEL override), the corresponding clock divider value(s) (DIV value override), and the corresponding clock gating control (CGC) states (CGC enable) using a monitor mode signal (e.g., monitor mode en). In this example, the SW configuration provides one set of information for the CCC 140, the SMSS 170, and one set of information is broadcast for other clock controllers. In response to such software configuration, the CMSM 230 generates the corresponding clock select (MUX SEL override), divider value (DIV value override), and the control gate circuit enable (CGC enable) signals.

As illustrated in FIG. 2, the CMSM 230 receives a programmable timer signal from a programmable timer 232 and an input selector MUX signal from an input selector MUX 234 to generate at a set of status outputs: a clock fault interrupt (CLK fault IRQ) in response to detecting a subsystem clock fault (a deviation of the frequency of a measured clock beyond the specified margin); and generates a self-test fail interrupt (self-test fail IRQ) in response to a reference clock fault (a deviation of the frequency of a measured reference clock beyond the specified margin). Similarly, the CMSM 230 generates a phase locked loop (PLL) out of lock interrupt (PLL out of lock IRQ) in response to receiving a PLL aggregated locks signal. The interrupts may be provided to an error management module (EMM) or designated safety processor (not shown in FIG. 2) for providing an appropriate response to the interrupts to ensure human safety in accordance with the safety-related application.

In this example, an output signal from the frequency measurement unit (FMU) 220 is supplied to the CMSM 230 to generate the CLK fault IRQ signal, the PLL out of lock IRQ signal, the SELF test fail IRQ signal, and a cmu_busy signal. As shown in FIG. 2, the FMU 220 receives a core clock signal (Cmu_core_clk), a measured clock signal (Cmu_measure_clk), and reference clock signals (acmu_ref1_clk, acmu_ref2_clk, acmu_ref3_clk, and acmu_ref4_clk). The reference clock signals (acmu_ref1_clk, acmu_ref2_clk, acmu_ref3_clk, and acmu_ref4_clk) are received through first multiplexer stages 240 and second multiplexer stages 250, including the measured clock signal (e.g., Cmu_measure_clk) to provide a measured clock signal (Fmu_measure_clk) and a reference clock signal (Fmu_ref_clk). Additionally, the reference clock signals (acmu_ref1_clk, acmu_ref2_clk, acmu_ref3_clk, and acmu_ref4_clk) and the core clock signal (e.g., Cmu_core_clk) are provided to the programmable timer 232.

As shown in FIG. 2, clock monitoring solutions in current chips involve routing of safety critical clocks from different subsystems in a funneled fashion to the ACMU 200. Although the ACMU is shown as a single device, it should be recognized that multiple ones of the ACMU 200 are generally implemented in an SOC for redundancy reasons (same clock monitored for example by two clock monitors) and for covering a wide set of clocks across the SOC. In operation, the ACMU 200 sends the mux select (MUX SEL override), the divider value (DIV value override), and the clock gate control enable (CGC enable) signals to subsystems. Additionally, the ACMU 200 monitors a selected clock for any frequency change from an expected frequency logged in an internal look up table (LUT). In various aspects of the present disclosure, the ACMU 200 selects different clocks for monitoring in round robin fashion. In other aspects, continuous monitoring is performed, as specified, by dedicating certain ACMUs for certain specific clocks. In practice, the ACMU 200 may be incorporated in an automotive chip.

Automotive system-on-chip (SoC) running safety critical applications include multiple safety features in hardware to provide automotive safety integrity level (ASIL-A/ASIL-B/ASIL-C/ASIL-D) compliance. One design aspect that is important for safe functionality of any chip is the generation and propagation of clocks for digital logic. An automotive SoC may use an automotive clock monitoring unit (ACMU) as an on-chip hardware safety feature for detecting and reporting any fault in the clocks used by safety critical subsystems. Current ACMU hardware is designed on the assumption that clock frequencies and clock running status are static and remain static during ongoing operation of safety critical subsystems. Unfortunately, static voltage and frequency conditions can result in thermal issues that involve hardware mitigation in the form of voltage/frequency reduction to conserve energy. Additionally, the different safety critical subsystems involve different voltage and frequency specifications, rendering fixed frequency solutions sub-optimal in terms of power consumption.

Various aspects of the present disclosure are directed to providing a clock monitoring subsystem for providing dynamic clock voltage scaling (DCVS) and/or dynamic frequency scaling (DFS) (DCVS/DFS) support in automotive chips. In various aspects of the present disclosure, a DCVS/DFS scheme is described in which distributed software/hardware entities change the clock frequencies dynamically without awareness of a centralized power management or voltage/clock control entity. In various aspects of the present disclosure, an ACMU is configured and maintained by safety manager software that operates at a higher safety level compared to subsystem software that manages dynamic frequency scaling for the subsystem clocks.

Figure 3:
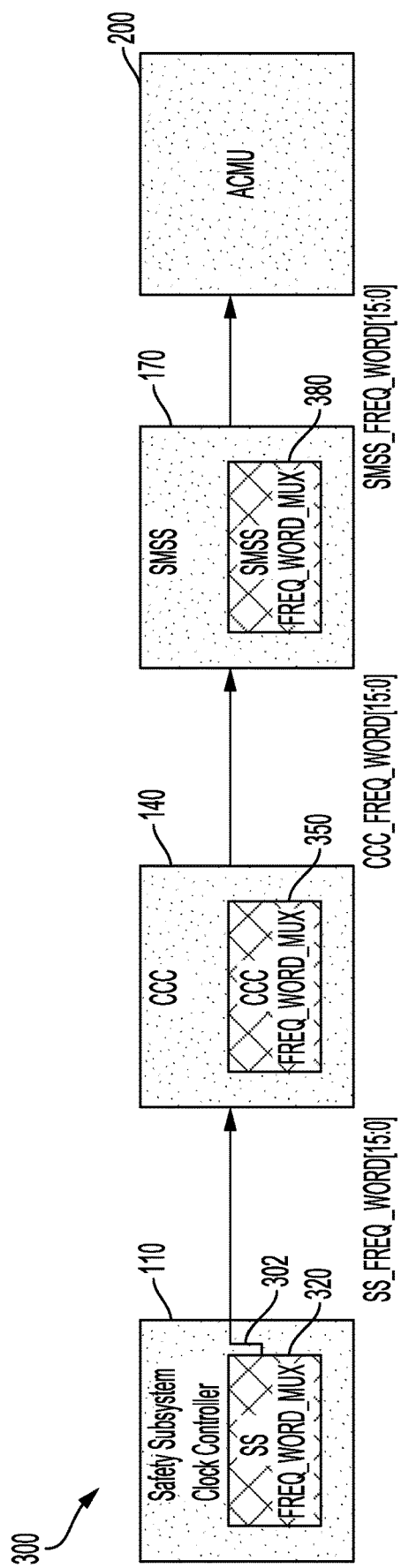
FIG. 3 is a block diagram illustrating an example of a clock monitoring system for system-on-chips (SoCs) supporting dynamic clocks and scaling and voltages gating, in accordance with various aspects of the present disclosure.

FIG. 3 is a block diagram illustrating an example of a clock monitoring system 300, in accordance with various aspects of the present disclosure. The clock monitoring system 300 supports a DFS interface 302 from the safety subsystem clock controller 110 to the CCC 140 to the SMSS 170 to the ACMU 200. According to various aspects of the present disclosure, the clock monitoring system 300 operates by funneling a frequency word (FREQ_WORD) (e.g., SS_FREQ_WORD[15:0]) from a frequency word multiplexer of the safety subsystem clock controller 110 to the ACMU 200. For example, the safety subsystem clock controller 110 includes a frequency word multiplexer (FREQ_WORD_MUX) 320, which funnels the SS_FREQ_WORD to the CCC 140 through the DFS interface 302. Additionally, the CCC 140 includes a FREQ_WORD_MUX 350, which funnels a CCC frequency word (CCC_FREQ_WORD[15:0]) to the SMSS 170. Similarly, the SMSS 170 includes a FREQ_WORD_MUX 380, which funnels a SMSS frequency word (SMSS_FREQ_WORD[15:0]) to the ACMU 200.

In various aspects of the present disclosure, the FREQ_WORD is funneled from the safety subsystem clock controller 110 to the ACMU 200 in the same manner as the subsystem clocks are funneled. In particular, funneling of FREQ_WORD may use the same MUX select values that are used for funneling the clocks. At any timeframe, the FREQ_WORD reaching the ACMU 200 corresponds to the clock that is selected by the ACMU 200 for monitoring. In various aspects of the present disclosure, each FREQ_WORD_MUX (e.g., 320, 350, 380) and each clock debug MUX (e.g., 120, 150, 190) share the same mux select lines to receive a multiplexer (MUX) select signal.

Figure 4:
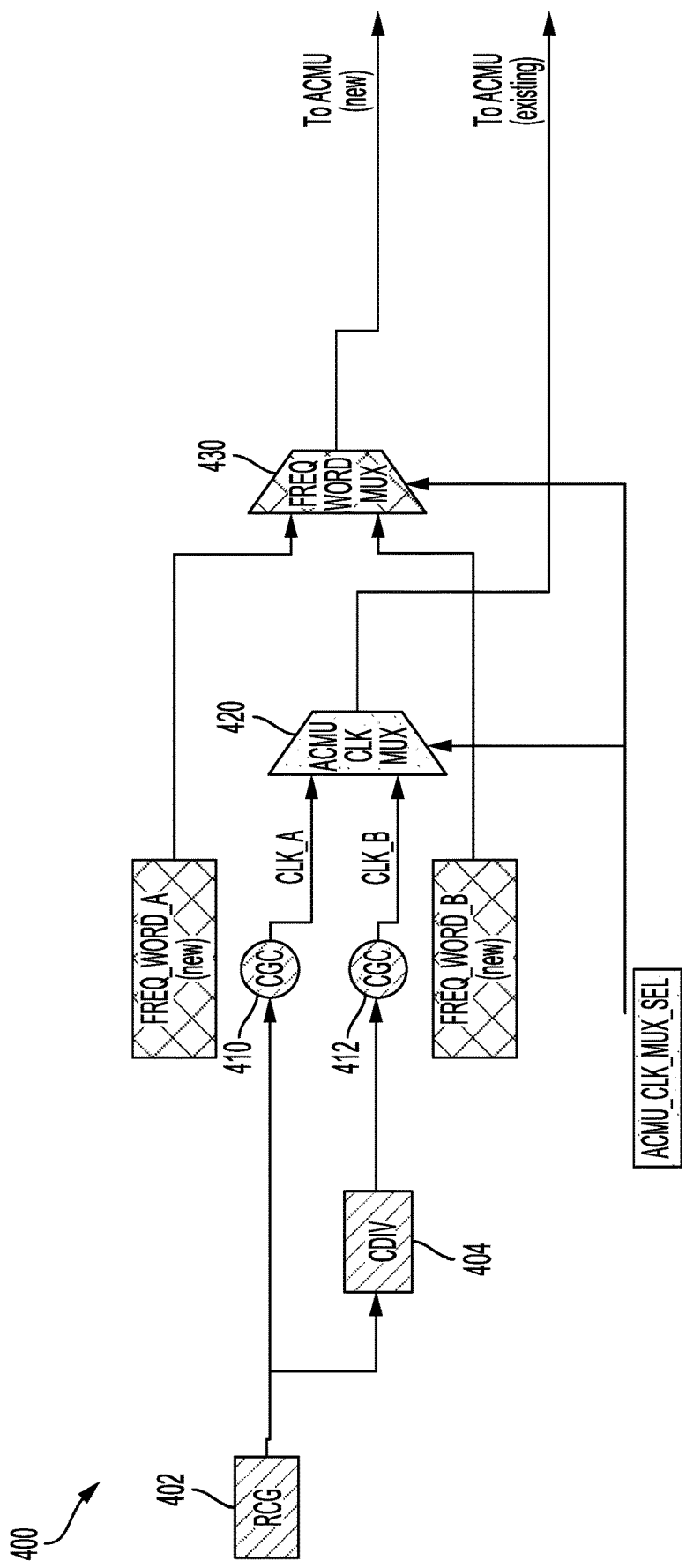
FIG. 4 is a block diagram illustrating a clock controller configured with frequency word multiplexing functionality, according to various aspects of the present disclosure.

FIG. 4 is a block diagram illustrating a clock controller configured with frequency word multiplexing functionality, according to various aspects of the present disclosure. As shown in FIG. 4, a clock controller 400 receives an input clock signal from a root clock generator (RCG) 402 that is routed to a first clock branch control (CBC) 410, and a clock divider 404, which routes a divided clock signal to a second CBC 412. In this example, the first CBC 410 outputs a clock signal A (CLK_A), and the second CBC 412 outputs a clock signal B (CLK_B) to an ACMU CLK MUX 420.

In various aspects of the present disclosure, the CLK_A signal includes an associated frequency word (FREQ_WORD_A) that carries frequency information of the CLK_A signal in a predefined format. Similarly, the CLK_B signal includes an associated frequency word (FREQ_WORD_B) that carries frequency information of the CLK_B signal in a predefined format. In this example, the FREQ_WORD_A and the FREQ_WORD_B are routed to a FREQ WORD MUX 430, which outputs a selected frequency word in response to a multiplexer select (ACMU_CLK_MUX_SEL) signal. Additionally, the ACMU_CLK_MUX_SEL signal also selects the associated clock signal (e.g., CLK_A/CLK_B).

In various aspects of the present disclosure, a FREQ_WORD format is defined as follows. For example, in this FREQ_WORD format, FREQ_WORD[15] indicates a CLK_DISABLE (e.g., the clock is gated). Additionally, FREQ_WORD[14:1] provides a frequency field to indicate a specified adjusted clock frequency level. For example, the clock frequency level may be defined using multiples of 1.92. In this example, 500 MHz is represented as 300/1.92=156 in binary. Similarly, FREQ_WORD[0]=1 is an invalidity bit to indicate if the frequency level provided by the FREQ_WORD[14:1] is invalid.

In various aspects of the present disclosure, subsystem software drivers are responsible for configuring frequency changes for subsystem clocks. For example, the subsystem software drivers may perform the following sequence to configure a frequency change. First the subsystem software drivers set the FREQ_WORD[14:1] to a specified value, and the FREQ_WORD[0] bit is set to '0x1' to indicate invalid for discontinuing clock monitoring. Once these fields of the FREQ_WORD are set, the subsystem software drivers initiate the frequency change. Once initiated, the subsystem software drivers are configured to perform a check that monitors whether the frequency change is complete. Once the frequency change is complete, the subsystem software drivers clear the FREQ_WORD[0] bit field with a value of '0x0' to indicate that the clock is ready for monitoring.

In some aspects of the present disclosure, if the frequency is being changed by a hardware entity, the subsystem hardware includes a mechanism for the hardware to generate FREQ_WORD in the specified format.

TABLE I

Clock Monitoring Options Supported by ACMU Design

| Change type | Cause of change | Motivation | Monitored node | ACMU expectation | Assumption of Use |
|---|---|---|---|---|---|
| Frequency change | SW initiated frequency change for preferred level change | Power/thermal saving | Clock gating circuit output | Skip monitoring during the transition phase. Monitor during steady state | SW development and CC CSR flops are ASIL-compliant |
| Output clocks turn off | SW initiated clock gating | Power/thermal saving | Clock gating circuit output | Skip monitoring during the transition phase. Monitor during steady state | SW development and CC CSR flops are ASIL-compliant |
| Output clocks turn off | HW/FW initiated clock gating | Power/thermal saving | Clock gating circuit output | Skip monitoring during the transition phase. Monitor during steady state | HW/FW logic generating clock gating request is ASIL-compliant |
| Output clocks turn off | SW triggered power gating | Power/thermal saving | Clock gating circuit output | Skip monitoring during the transition phase. Monitor during steady state | SW development and CC CSR flops are ASIL-compliant |

As shown in Table I, various clock monitoring options are supported by an automotive clock monitoring unit (ACMU) design according to various aspects of the present disclosure. For example, the various columns of Table I include a change type, cause of change, motivation, monitored mode, ACMU expectation, and assumption of use. In this example, row one of Table I refers to a frequency change type, which is software (SW) initiated by frequency change to a preferred frequency level. The motivation for the frequency change may include power savings and/or thermal savings, which is the motivation for each of the change types noted in Table I.

As shown in the monitored mode column of Table 1, the monitored node refers to a clock gating circuit output (e.g., a clock branch cell (CBC)/power switch CBC (PSCBC) output and/or a phase locked loop (PLL) output). As shown in the ACMU expectation column of Table I, the ACMU 200 skips monitoring during a transition phase and resumes monitoring during a steady state. As shown in the assumption of use column of Table I, software (SW) development and automotive safety integrity level (ASIL)-compliant clock control (CC) configuration state register (CSR) flops. The remaining rows of Table I refer to software (SW)/hardware (HW)/firmware (FW)-based output clock turn off for providing dynamic clock voltage scaling (DCVS).

Figure 5A:
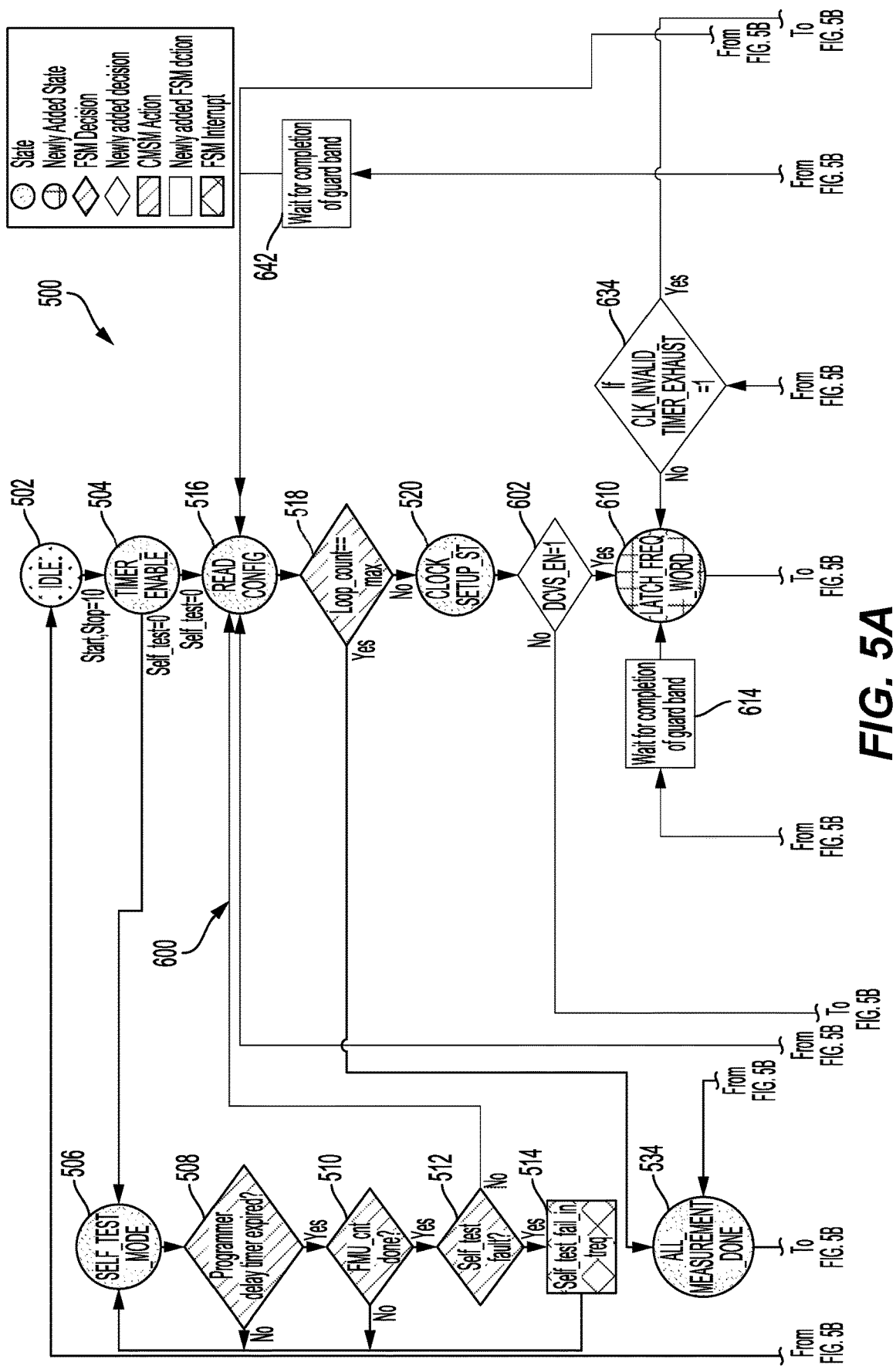
FIGS. 5A-5C show a flow chart illustrating a process for operation of the control unit clock monitor state machine (CMSM) of FIGS. 1 and 2, in accordance with various aspects of the present disclosure.
Figure 5B:
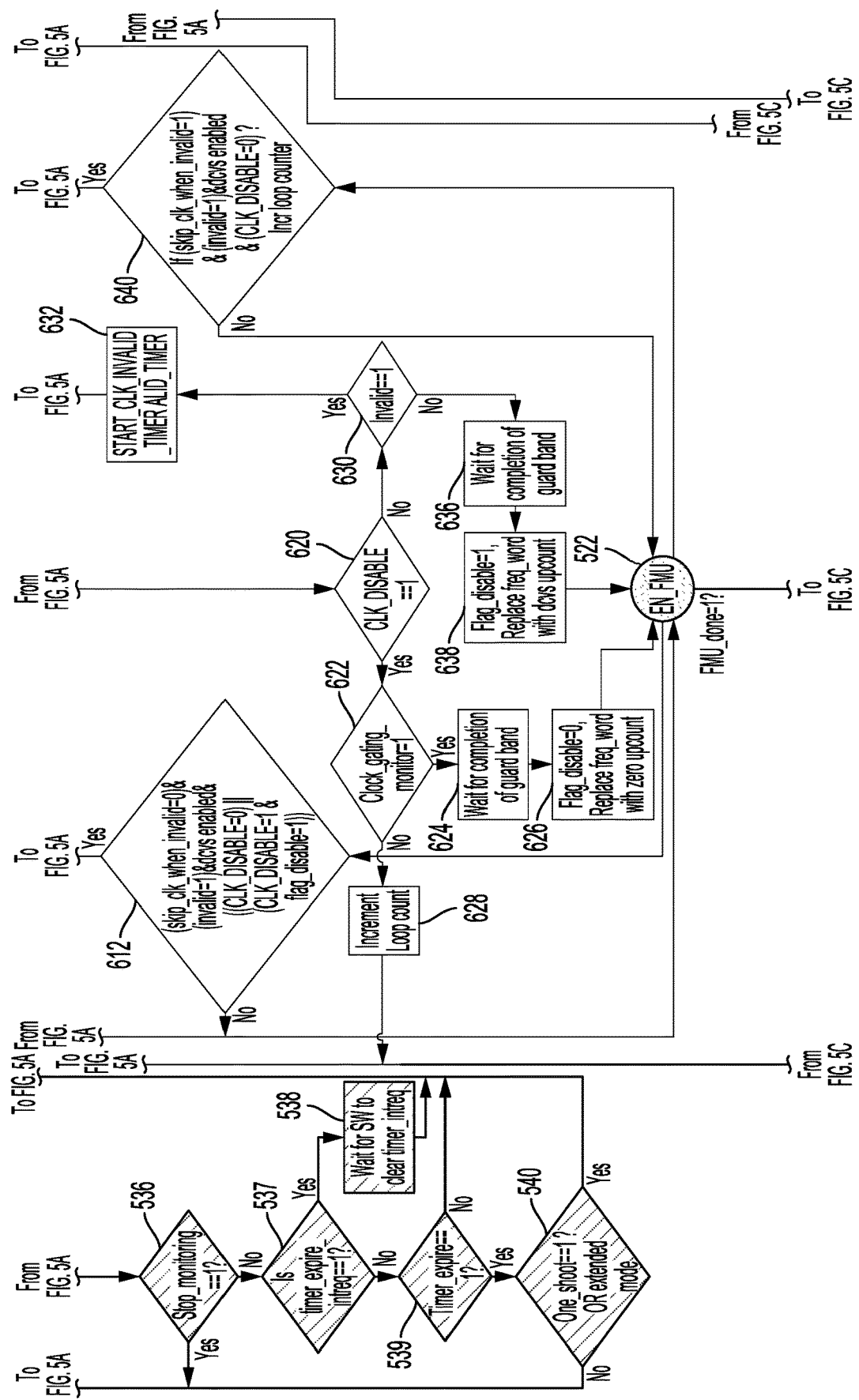
Figure 5C:
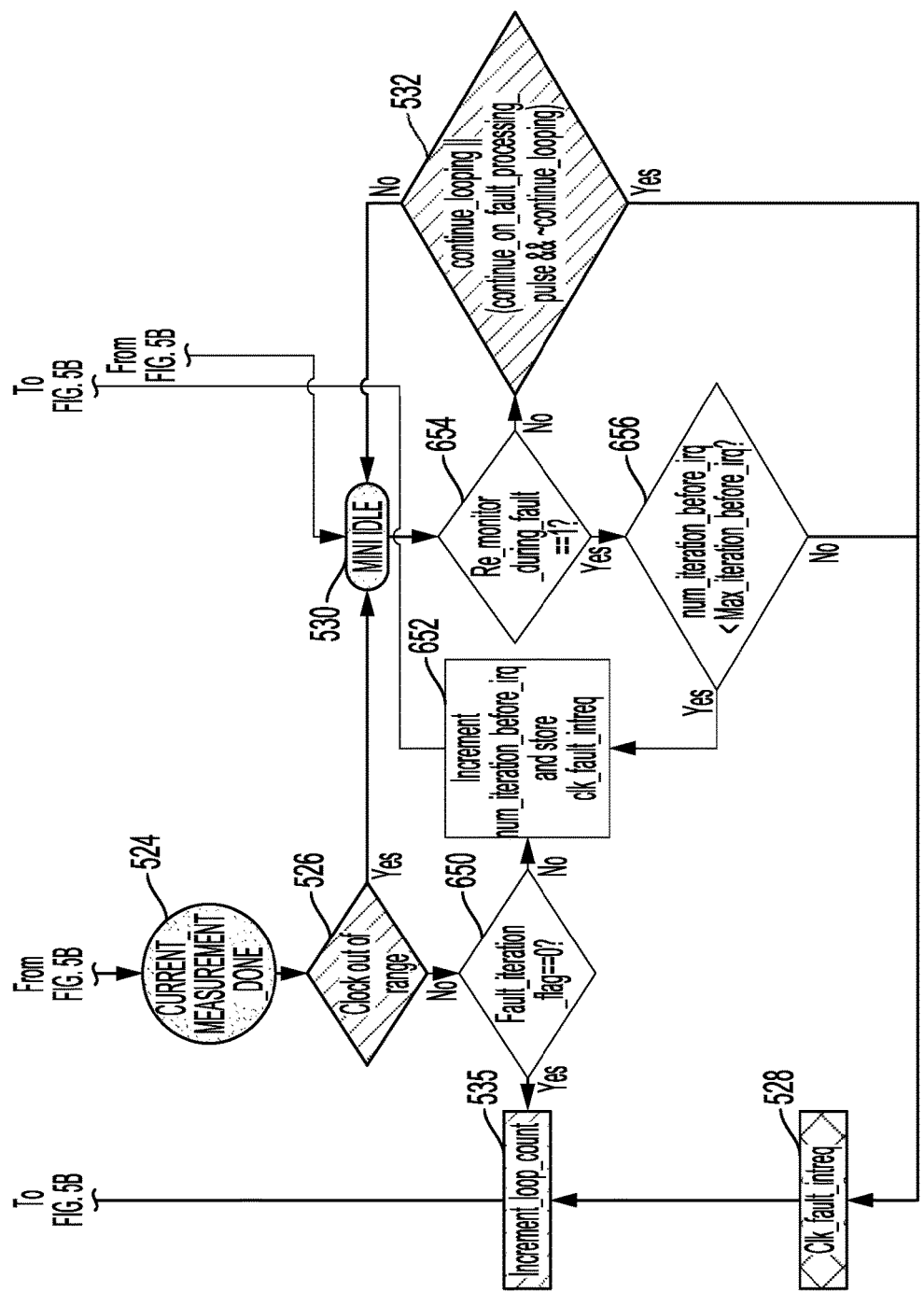

FIGS. 5A-5C show a flow chart illustrating a process 500 for operation of the control unit clock monitor state machine (CMSM) 230 of FIGS. 1 and 2, in accordance with various aspects of the present disclosure. Referring again to FIGS. 1 and 2, the ACMU 200 performs clock monitoring based on a hardware configuration scheme of the CMSM 230, according to various aspects of the present disclosure. Initially, the control unit CMSM 230 enters an idle state 502 in response to a reset signal, which also resets an associated timer for keeping track of the time elapsed during a current measurement cycle. In response to a start signal being asserted (e.g., Start, stop=10) in a software configuration register, the control unit CMSM 230 enables the timer enable (TIMER_ENABLE state 504). In the timer_enable state 504, the software configuration processor clears the timer expiration interrupt (TIMER_EXP_IRQ) and the timer is started. Additionally, in the timer_enable state 504, the control unit CMSM 230 asserts a busy signal to indicate to the software configuration processor that a clock frequency measurement has begun. In this example, the control unit CMSM 230 sets a loop counter to zero (0); the loop counter identifies the clock whose frequency is currently being measured during the measurement cycle.

At the timer_enable state 504, the control unit CMSM 230 determines whether a self-test bit is asserted (Self_test==1) in the SW configuration register. If the control unit CMSM 230 determines that the self-test signal is asserted, the control unit CMSM 230 then enters a self-test (SELF_TEST) mode 506. In this example, pursuant to the self-test, the control unit CMSM 230 provides instructions and initiates the FMU 220 to perform a frequency measurement of a selected measured reference clock (frequency to be measured) based on a selected measuring reference clock (clock serving as the reference for the measurement). The selected measured reference clock is the one that will be used to measure the frequencies of the selected subsystem clocks pursuant to the current measurement cycle. During the self-test, the control unit CMSM 230 determines whether a programmed delay timer has expired (decision block 508). The programmed delay is a time delay between initiating the FMU 220 and determining whether the FMU is done performing the reference clock frequency measurement.

In this example, if the programmed delay timer has not expired, the control unit CMSM 230 remains in the self-test state 506. If the programmed delay time has expired, the control unit CMSM 230 determines whether the FMU 220 has completed the frequency measurement (decision block 510). If the FMU 220 has not completed the reference clock frequency measurement, the control unit CMSM 230 remains in the self-test state 506. If the control unit CMSM 230 determines that the FMU 220 has completed the reference clock frequency measurement, the control unit CMSM 230 determines whether the frequency of the selected measured reference clock is within specification (e.g., measured frequency is within target frequency±margin), for example, whether a self_test_fail occurred (decision block 512). If the measured frequency is within specification (no self_test_fail), the control unit CMSM 230 continues to a read configuration state 516 to begin the frequency measurements of the selected subsystem clocks. If the measured frequency is not within specification (self_test_fail occurred), the control unit CMSM 230 generates a self-test fail interrupt (SELF_TEST_FAIL_IRQ) (block 514). The control unit CMSM 230 remains in the self-test state 506 until the software configuration processor asserts and de-asserts the stop_monitoring signal and brings the control unit CMSM 230 back to the self-test state 506. The software configuration processor may subsequently clear the self-test fail interrupt.

Pursuant to the read configuration state 516, the control unit CMSM 230 increments a loop count (e.g., loop count is set to one (1) when the read configuration state 516 is first reached) and reads the measurement configuration to determine whether the clock identified by the loop count is set for measurement. If the clock is not enabled for measurement, the control unit CMSM 230 increments the loop count and determines again whether the clock identified by the loop count is enabled for measurement. The control unit CMSM 230 continues this process until it determines a clock identified by the loop count that is enabled. In which case, the control unit CMSM 230 determines whether the loop count is greater than the maximum number of clocks (decision block 518). If the loop count is greater than the maximum number of clocks, all of the clocks pursuant to the current measurement cycle have been measured. If the loop count is not greater than the maximum, the control unit CMSM 230 proceeds to a clock setup state 520.

In various aspects of the present disclosure, the process 500 of FIGS. 5A-5C is modified to support a process for a clock monitoring subsystem of system-on-chip (SoC) supporting dynamic clock scaling and voltage gating. In various aspects of the present disclosure, a clock monitoring subsystem process supports dynamic clock voltage scaling (DCVS) and/or dynamic frequency scaling (DFS) (DCVS/DFS) process, in which distributed software/hardware entities change the clock frequencies dynamically without awareness of a centralized software entity, as further illustrated in FIGS. 6A and 6B. This clock monitoring subsystem process 600 is composed of process blocks 602-642, which are inserted between process blocks 520 and 522 of the process 500, as further illustrated in FIGS. 6A and 6B.

Pursuant to the clock setup state 520, the control unit CMSM 230 reads the software configuration register to generate the clock select signal (CLK_SEL), the divider value (DIV_VAL) signal, and the gate enable signal (GATE_EN) to route (and frequency divide) the clock identified by the current loop count to the FMU 220 for frequency measurement. Once the clock identified by the current loop count is routed to the FMU 220, the control unit CMSM 230 waits a few clock cycles and then enables the FMU 220 to perform the frequency measurement (EN_FMU) state 522. The control unit CMSM 230 then proceeds to the current measurement done state (CURRENT_MEASUREMENT_DONE) 524 and subsequently determines whether the frequency of the clock identified by the current loop count is within specification (decision block 526).

If the measured frequency is within specification, the control unit CMSM 230 proceeds to the read configuration state 516 to increment the loop count and determine whether the clock identified by the loop count is enabled for measurement based on the current SW configuration, as previously discussed. If the measured frequency is not within specification, the control unit CMSM 230 generates a clock fault interrupt (Clk_fault_intreq) (process block 528). The control unit CMSM 230 then enters a MINI IDLE state 530, where it stops the timer and de-asserts the busy signal. The control unit CMSM 230 also determines whether a continue_on_fault bit in the software configuration registers is asserted (decision block 532). If the continue_on_fault bit is asserted at decision block 532, the control unit CMSM 230 proceeds to process block 528 and subsequently the increment loop count state 535 and then returns to the read configuration state 516. As noted above, the read configuration state 516 determines whether the clock identified by the increment loop count state 535 is enabled for measurement based on the current software configuration. If the continue_on_fault bit is not asserted at decision block 532, the control unit CMSM 230 remains in the MINI IDLE state 530 and waits for software intervention.

If in decision block 518, the control unit CMSM 230 determines that the loop count is greater than the maximum, the control unit CMSM 230 proceeds to the All_measurement_done state 534, where it asserts the done signal. The control unit CMSM 230 then determines whether the stop monitoring signal is asserted (decision block 536). If the stop monitoring signal is asserted, the control unit CMSM 230 proceeds back to the idle state 502. If the stop monitoring signal is not asserted, the control unit CMSM 230 determines whether the timer has expired (decision block 539). If the timer has not expired, the control unit CMSM 230 returns back to the All_measurement_done state 534. If the timer has expired, the control unit CMSM 230 determines whether the one_shot signal or an extended mode is asserted in the software configuration register (block 540). If the timer has not expired, the control unit CMSM 230 proceeds back to the idle state 502. If the one_shot signal is asserted, the control unit CMSM 230 returns back to the All_measurement_done state 534. In such case, the SW processor needs to clear any generated interrupt (block 538) and assert and de-assert the stop monitoring bit to return the control unit CMSM 230 to the idle state 502.

Figure 6A:
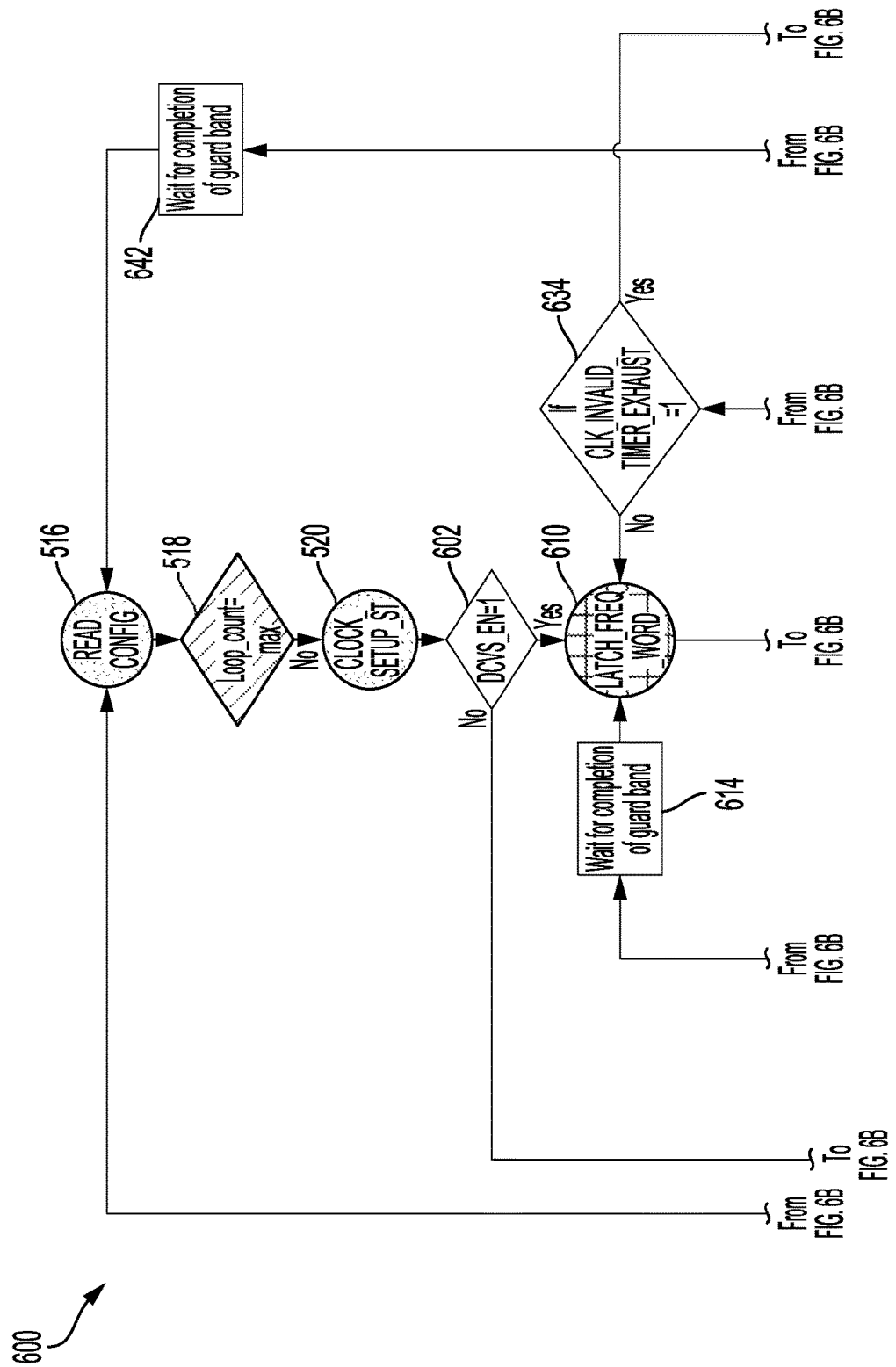
FIGS. 6A and 6B illustrate a flow chart showing a clock monitoring subsystem for a system-on-chip (SoC) supporting dynamic clock scaling and voltage gating process, according to various aspects of the present disclosure.
Figure 6B:
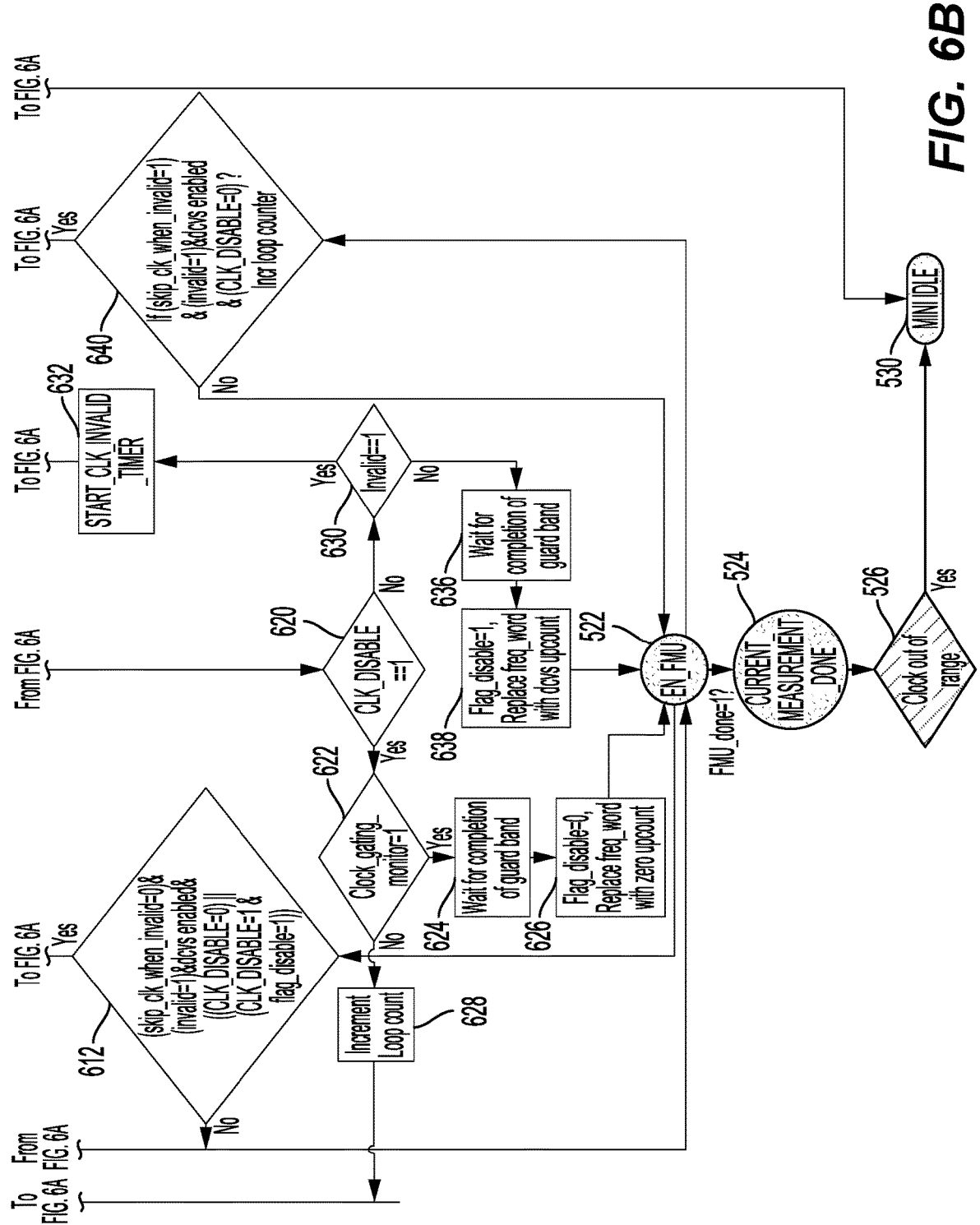

As shown in FIGS. 5A-5C, the process 500 is modified to support the clock monitoring subsystem process 600, in which distributed software/hardware entities change the clock frequencies dynamically without awareness of a centralized software entity, as further illustrated in FIGS. 6A and 6B. In various aspects of the present disclosure, the MINI IDLE state 530 is modified when the decision block 526 determines the clock is out of range. Rather than returning to the read configuration state 516, a decision block 650 is added to determine whether a fault iteration flag equals zero (Fault_iteration_flag==0). If the fault iteration flag equals zero, then control flows to the increment loop count state 535 and returns to the read configuration state 516, as described above. If the fault iteration flag does not equal zero, then control flows to process block 652, in which a number of iteration before interrupt count (num_iteration_before_irq) is incremented and a clock fault interrupt request (clk_fault_intreq) is stored. Once incremented and stored, control flow returns to the read configuration state 516.

In various aspects of the present disclosure, from the MINI IDLE state 530, a decision block 654 is added to determine whether a re-monitor during fault flag is asserted (Re_monitor_during_fault==1). When the flag is asserted, decision block 656 determines whether the num_iteration_before_irq value is less than a maximum iteration before interrupt (Max_iteration_before_irq) value. When the decision block 656 is true, control flow branches to process block 652. Otherwise, control flow branches to process block 528, as described above.

FIGS. 6A and 6B illustrate a flow chart showing a clock monitoring subsystem process 600 for a system-on-chip (SoC) supporting dynamic clock scaling and voltage gating, according to various aspects of the present disclosure. In various aspects of the present disclosure, the clock monitoring subsystem process 600 provides a solution in which distributed software/hardware entities change the clock frequencies dynamically without awareness of a centralized software entity. Additionally, the clock monitoring subsystem process 600 shown in FIGS. 6A and 6B provides a hardware communication-based solution for seamless transiting of the ACMU 200 to different frequency monitoring nodes, without the software latencies, while honoring fault detection time interval (FDTI) specifications and with minimal hardware overhead.

Figure 7A:
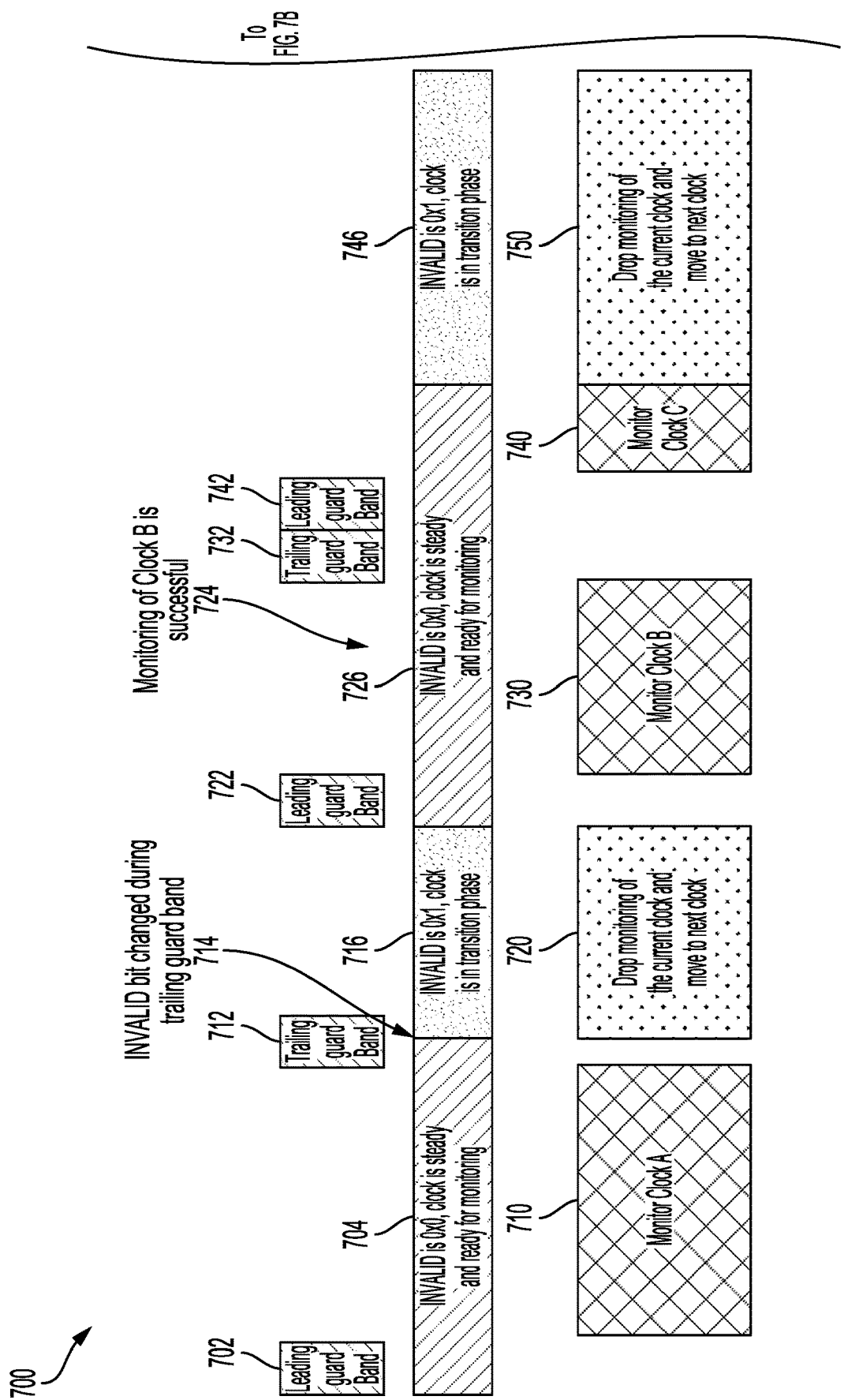
FIGS. 7A and 7B are block diagrams illustrating a clock frequency monitoring process, according to various aspects of the present disclosure.
Figure 7B:
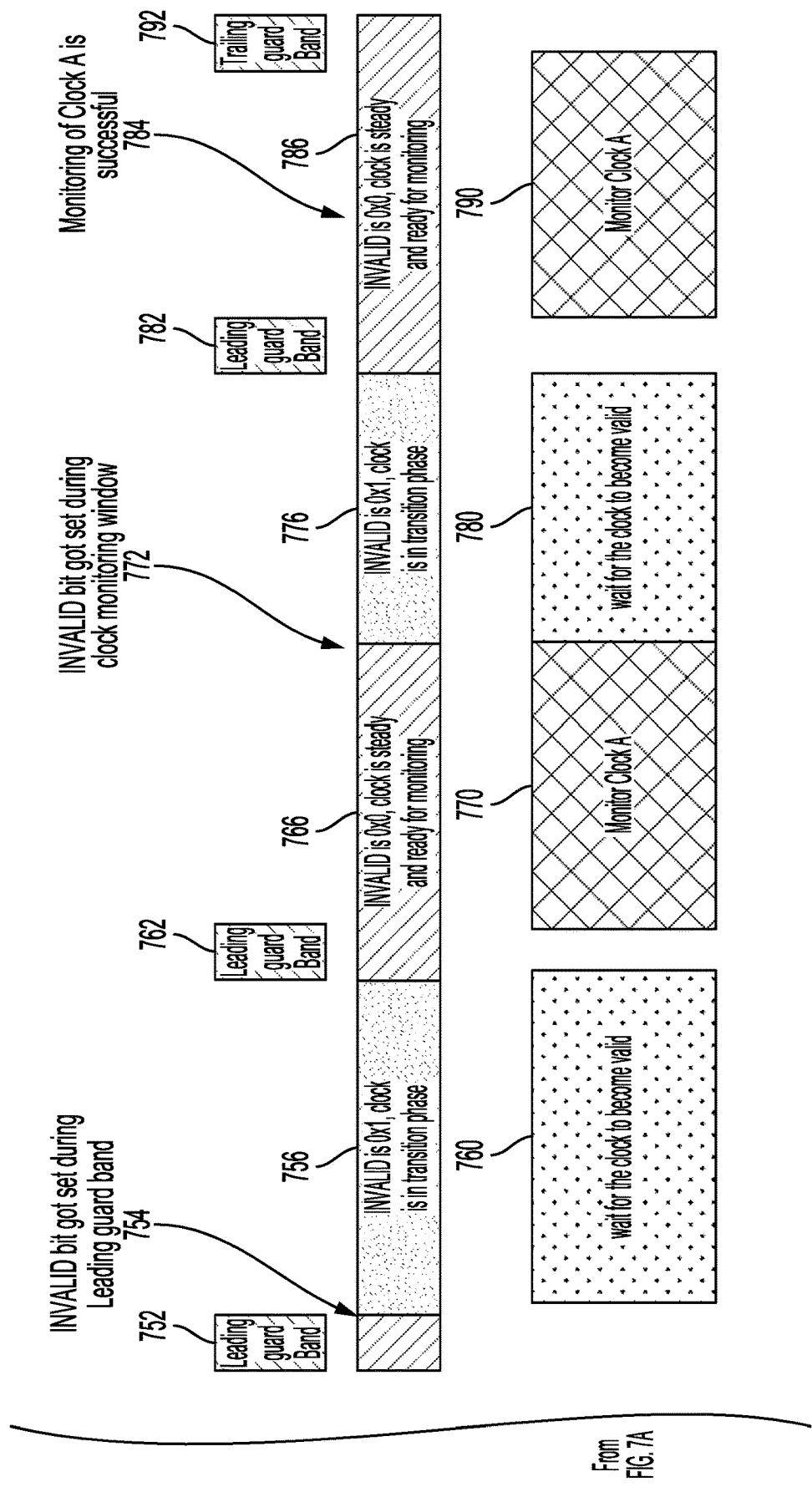

As shown in FIGS. 6A and 6B, a decision block 602 determines whether dynamic clock voltage scaling (DCVS) is enabled (DCVS_EN=1). If the DCVS is disabled, control branches to a frequency measurement (EN_FMU) state 522 of the process 500 shown in FIG. 5B. Otherwise, DCVS is enabled, and a frequency word is latched at process block 610 (LATCH_FREQ_WORD). At decision block 620, it is determined whether the clock is disabled (CLK_DISABLE==1). When decision block 620 is true (e.g., CLK_DISABLE==1), at block 622, it is determined whether clock gate monitoring is being performed (e.g., clock_gating_monitor=1). When clock gating is enabled, at block 624, a wait is performed for completion of a guard band, for example, as shown in FIGS. 7A and 7B. Once the guard band completes, at process block 626, a disabled flag is set to zero (Flag_disable=0) and the frequency word is replaced with a zero upcount to perform clock gating, followed by a transition to the EN_FMU state 522. Otherwise, the loop count is incremented (at block 628), and control flow returns to the read configuration state 516.

Referring again to the decision block 620, when the clock is enabled (e.g., CLK_DISABLE==0), decision block 630 determines whether the frequency word is invalid (e.g., Invalid=1). When the frequency word is invalid, at block 632, a timer is initiated (e.g., START_CLK_INVALID_TIMER). At decision block 634, it is determined whether the timer has expired (e.g., CLK_INVALID_TIMER_EXHAUST=1). If the timer expires, control flow returns to process block 610. Otherwise, control flow branches to the MINI IDLE state 530. Referring again to the decision block 630, if the frequency word is valid (e.g., Invalid==0), at process block 636, a wait is performed for completion of a guard band, for example, as shown in FIGS. 7A and 7B. Once completed, at process block 638, a disabled flag is set to one (Flag_disable=1) and the frequency word is replaced with a DCVS upcount, followed by a transition to EN_FMU state 522. When decision block 612 is true (e.g., If (skip_clk_when_invalid=0) & (invalid==1) & devs enabled & ((CLK_DISABLE=0)||((CLK_DISABLE==1) & flag_disable==1)?) a wait for guard band completion is performed at process block 614. Otherwise control flow returns to the EN_FMU state 522. Additionally, when decision block 640 is true (e.g., if (skip_clk_when_invalid=1) & (invalid=1) & devs enabled & (CLK_DISABLE=0)), the loop counter is incremented, followed by a wait for guard band completion at process bock 642. Otherwise control flow returns to the EN_FMU state 522.

FIGS. 7A and 7B are a block diagram illustrating a clock frequency monitoring process 700 according to various aspects of the present disclosure. In operation, the ACMU 200 takes the target frequency information from a local look-up table (LUT) register space configured by a safety manager software. As shown in FIGS. 5-7B, the ACMU 200 monitors the incoming FREQ_WORD for the selected clock continuously for any changes between leading guard bands and trailing guard bands. Any change in the FREQ_WORD is detected as an indication that the clock is going through a frequency change and hence the ongoing monitoring is dropped. For example, as shown in FIGS. 7A and 7B, following a leading guard band 702, the ACMU 200 monitors the incoming FREQ_WORD, which is set to invalid (e.g., 0x0), and determines the clock is steady and ready for monitoring during a monitoring window 704. In response, the ACMU 200 monitors a clock A at process block 710.

In this example, a trailing guard band triggers an end of the monitoring window 704, which is followed by latching of a new FREQ_WORD prior to a non-monitoring window 716. Once latched, the control unit CMSM 230 of the ACMU 200 determines, at step 714, that an INVALID bit of the new FREQ_WORD changed during the trailing guard band 712. In response, the ACMU 200 drops monitoring of the current clock and moves on to a next clock during process block 720. According to various aspects of the present disclosure, the control unit CMSM 230 of the ACMU 200 can decide to wait for the frequency of the current clock to settle or move on to monitoring of the next clock. In these aspects of the present disclosure, the control unit CMSM 230 of the ACMU 200 latches the FREQ_WORD at the beginning of the monitoring windows and continuously checks for changes in the FREQ_WORD during the monitoring window. For example, an INVALID bit indicator in the FREQ_WORD indicates that the frequency information carried by the FREQ_WORD bus is not valid/dependable.

Referring again to FIGS. 7A and 7B, a leading guard band 722 marks the end of the non-monitoring window 716 and initiation of a next monitoring window 726, in which the incoming FREQ_WORD, which is set to invalid (e.g., 0x0), and the clock is steady and ready for monitoring. During the next monitoring window 726, a next clock B is monitored at process block 730. As noted, at step 724, monitoring of the next clock B is successfully completed at process block 730. Next, a training guard band 732 is flowing by a leading guard band 742, which triggers monitoring of a clock C, at process block 740. In this example, however, the INVALID bit indicator in the FREQ_WORD is asserted (e.g., 0x1), during a non-monitoring window 746. The INVALID bit indicator triggers dropping of the monitoring of the clock C and moving on to the next clock at process block 750.

As shown in FIGS. 7A and 7B, during a leading guard band 752, setting of the INVALID bit indicator is detected at step 754. As a result, monitoring is not performed during a non-monitoring window 756 until a valid clock is detected at process block 760. In this example, a leading guard band 762 of a next monitoring window 766 is shown. In the next monitoring window 766, the INVALID bit indicator is de-asserted (e.g., 0x0) and the clock is steady and ready for monitoring. As a result, clock A is monitored at process block 770. At step 772, however, the INVALID bit indicator is asserted, which initiates a non-monitoring window 776. During the non-monitoring window 776, a wait is performed for the clock to become valid. Next, a leading guard band 782 initiates a next monitoring window 786, in which the INVALID bit indicator is de-asserted, and the clock is steady and ready for monitoring. At process block 790 the clock A is monitored again and monitoring of the clock A is successfully completed at step 784. The next monitoring window 786 is terminated by the training guard band 792.

As shown in FIGS. 7A and 7B, the clock frequency monitoring process 700 involves multiple decisions that the ACMU 200 can perform when a frequency change is encountered. For example, as shown in process blocks 760 and 780, the ACMU 200 waits for the clock (or FREQ_WORD) to become stable and re-monitors the same clock, as shown in process blocks 770 and 790. Alternatively, the ACMU 200 may drop the current monitoring and move to monitoring of a next clock, as shown in process blocks 720 and 750. Additionally, the ACMU 200 records the history of frequency changes for the clock being monitored. As further illustrated in FIGS. 7A and 7B, guard band windows (e.g., 702, 712, 722, 732, 742, 752, 762, 782, and 792) are added in the control unit CMSM 230 to accommodate any differences between the clock and FREQ_WORD propagation delays. Beneficially, the FREQ_WORD can be routed asynchronously from the subsystem clock controller to the ACMU 200 without the overhead of a timing check. Presence of test logic for the FREQ_WORD and mux select structure makes the ACMU 200 design more dependable.

In various aspects of the present disclosure, the ACMU 200 supports dynamic frequency scaling (DFS) using external frequency information (e.g., on a per clock basis), such that the DFS feature is selectively applied for certain clocks. In operation, communication from the subsystem clock controller to the ACMU 200 is performed in hardware and happens within a predetermined amount of time (e.g., hundreds of nanoseconds). By contrast, a software-based solution incurs variable latencies as significant as milliseconds. Additionally, the proposed solution is scalable to include additional subsystems into the DFS scheme without any change in the design of the ACMU 200 or the control unit CMSM 230.

Figure 8:
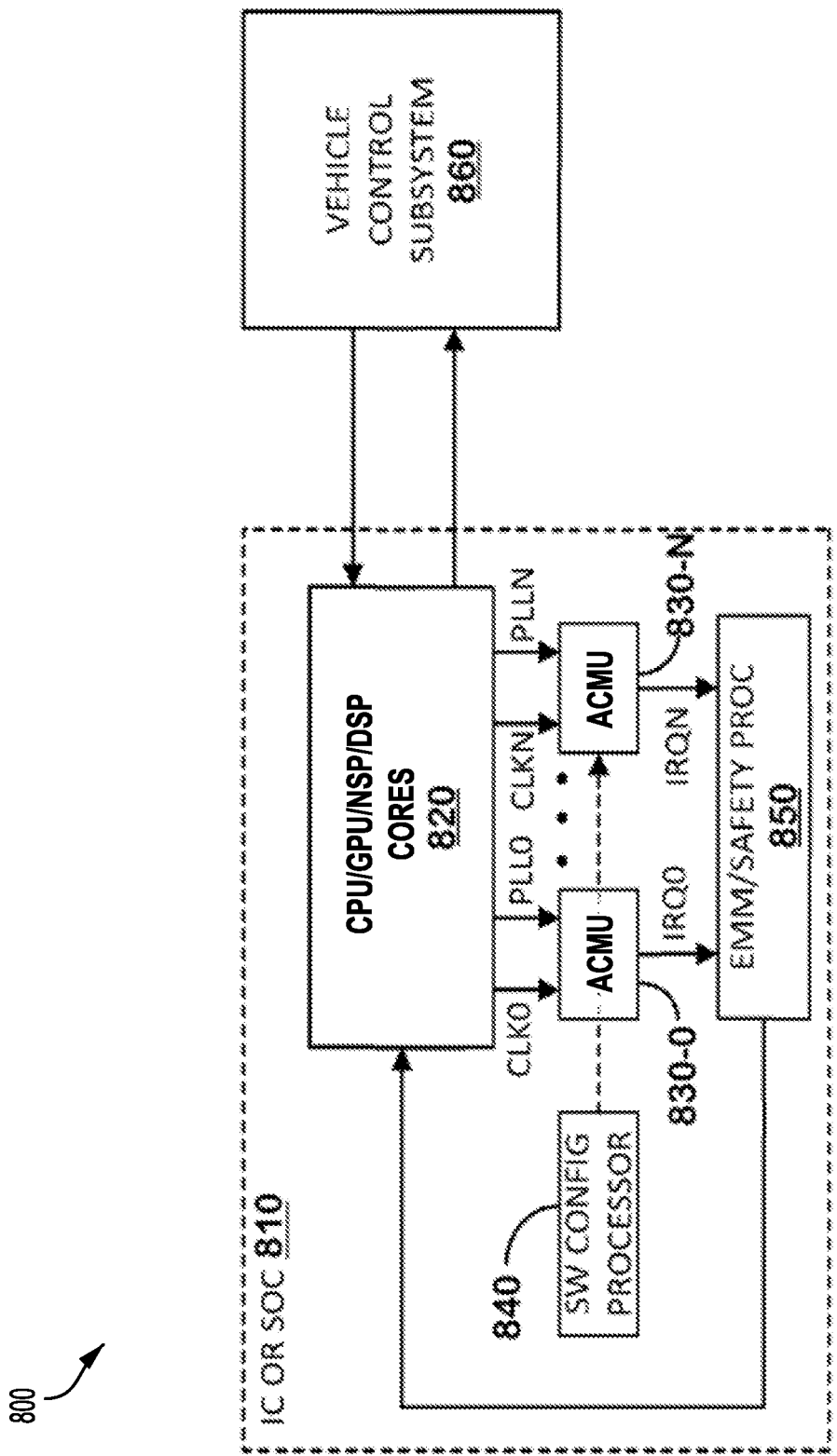
FIG. 8 is a block diagram of an example vehicle system, in accordance with various aspects of the present disclosure.

FIG. 8 illustrates a block diagram of an example vehicle system 800, in accordance with various aspects of the present disclosure. In this example, the vehicle system 800 pertains to an automotive system, but it shall be understood that other types of systems may employ clock monitoring systems as described herein.

The vehicle system 800 includes an integrated circuit (IC) 810, which may be configured as a system on chip (SoC). The IC 810 includes a set of one or more central processing unit (CPU)/graphics processing unit (GPU)/neural signal processor (NSP)/digital signal processing (DSP) cores 820, which, in turn, includes a set of clock generators driven by a set of phase locked loops (PLLs). The set of clock generators generate clocks CLK0 to CLKN for driving the data processing operation of the set of the CPU/GPU/NPU/DSP cores 820.

The IC 810 further includes a set of one or more clock monitoring units (e.g., ACMU 830-0 to ACMU 830-N) configured to receive the set of clocks CLK0 to CLKN, for example, via multiple clock routing lines, as discussed. The ACMU 830-0 to ACMU 830-N are also configured to receive PLL lock detect/status signals PLL0 to PLLN from the set of PLLs, respectively. Each of the ACMU 830-0 to ACMU 830-N may be configured per the ACMU 200, for example, as shown in FIGS. 1 and 2, using the SMSS 170. The IC 810 further includes a software (SW) configuration processor 840 to configure the set of the ACMU 830-0 to 830-N as previously discussed. The ACMUs 830-0 to 830-N are configured to generate a set of interrupts IRQ0 to IRQN if any clock faults, PLL faults, timer expiration faults, and/or self-test faults are detected, as well as clock frequency changes, as previously discussed.

The IC 810 further includes an error management module (EMM) 850 (or safety processor) configured to receive one or more of the set of interrupts IRQ0 to IRQN if the corresponding one or more faults are detected by the set of ACMUs 830-0 and 830-N. The EMM 850 generates a fault response (FAULT_RESP) based on the one or more of the set of interrupts IRQ0 to IRQN received. For example, the CPU/GPU/NPU/DSP cores 820 may generate one or more warnings to the operator (driver) associated with the vehicle system 800, and/or disable any one or more components of a vehicle control subsystem 860, and/or activate some components and/or deactivate other components of the vehicle control subsystem 860, etc. This is done to ensure the safety of the occupants of the associated vehicle, as well as others who may collide with the vehicle.

The vehicle control subsystem 860 may include such components as a cruise control subsystem, a forward collision warning (FCW) subsystem, lane departure warning (LDW) subsystem, blind spot detection (BSD) warning subsystem, adaptive cruise control (ACC) subsystem, lane keep assist (LKA) subsystem, ACC with lane keeping subsystem, traffic jam assist subsystem, full highway autopilot subsystem, full urban autopilot subsystem, robo-taxi/shuttle subsystem, autonomous delivery fleet subsystem, or other. A process or operation of the ACMU 830 is shown, for example, in FIG. 9.

Figure 9:
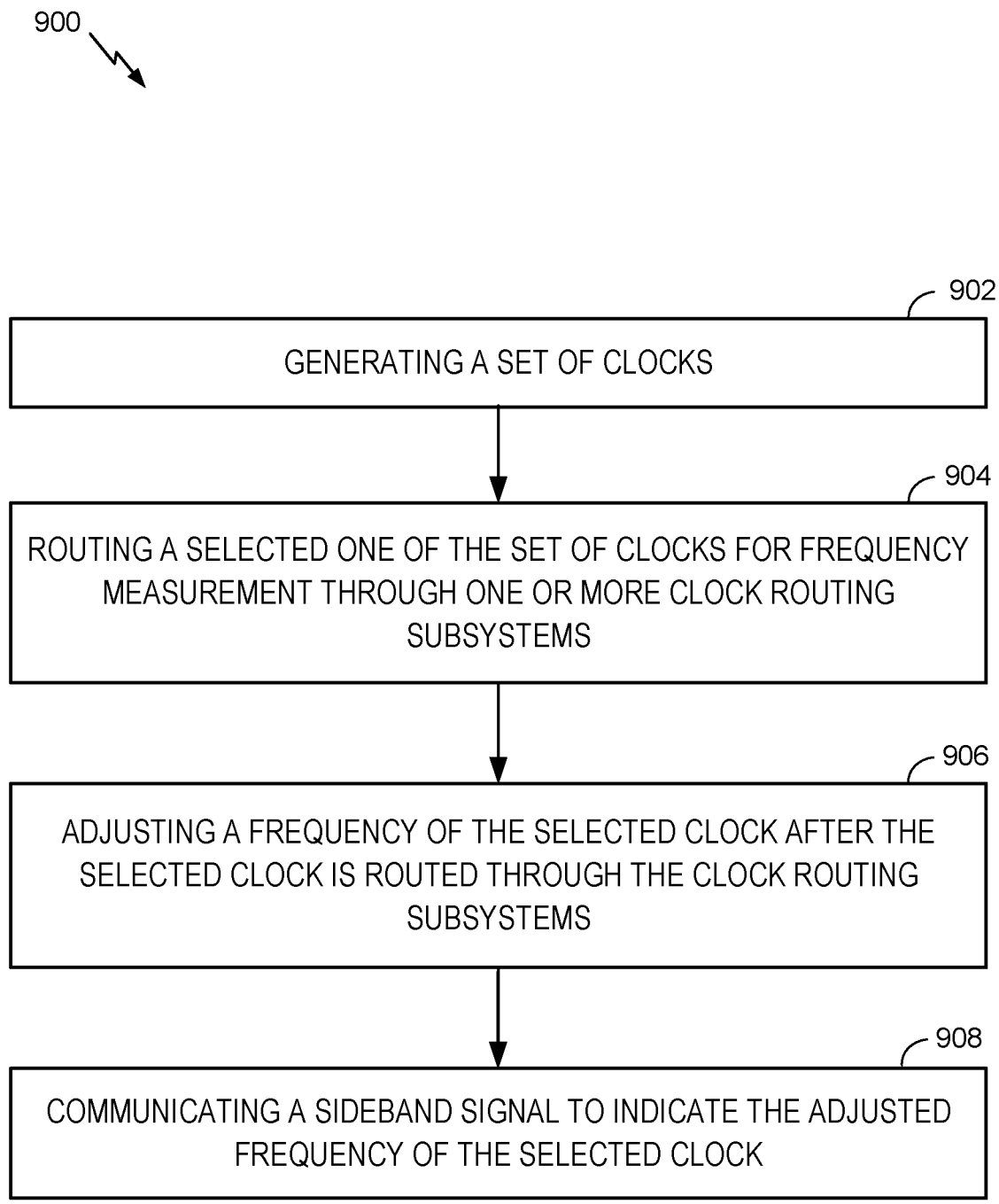
FIG. 9 is a process flow diagram illustrating a method for a clock monitoring subsystem of a system-on-chip (SoC) supporting dynamic clock scaling and voltage gating, according to various aspects of the present disclosure.

FIG. 9 is a process flow diagram illustrating a method for a monitoring unit of architectures in which clocks and voltages are dynamically scaled, according to various aspects of the present disclosure. A method 900 begins at block 902, in which a set of clocks is generated. For example, as shown in FIG. 8, The IC 810 further includes a set of one or more clock monitoring units (e.g., ACMU 830-0 to ACMU 830-N) configured to receive the set of clocks CLK0 to CLKN, for example, via a serial clock routing pipeline as discussed.

At block 904, a selected one of the set of clocks is routed for frequency measurement through one or more clock routing subsystems. For example, as shown in FIG. 1, the FMU 220 is configured to process the selected clock, or more specifically, measure a frequency of the selected clock based on the selected reference clock, and generate a value indicative of such frequency at a frequency measurement output coupled to an input of the CMSM 230. The ACMU 200 is further illustrated in FIG. 2, according to various aspects of the present disclosure.

At block 906, a frequency of the selected clock is adjusted after the selected clock is routed through the clock routing subsystems. For example, as shown in FIG. 4, a FREQ_WORD format is defined as follows. For example, in this FREQ_WORD format, FREQ_WORD[15] indicates a CLK_DISABLE (e.g., the clock is gated). Additionally, FREQ_WORD[14:1] provides a frequency field to indicate a specified adjusted clock frequency level. For example, the clock frequency level may be defined using multiples of 1.92. In this example, 500 MHz is represented as 300/1.92=156 in binary. Similarly, FREQ_WORD[0]=1 is an invalidity bit to indicate if the frequency level provided by the FREQ_WORD[14:1] is invalid.

At block 908, a sideband signal is communicated to indicate the adjusted frequency of the selected clock. For example, as shown in FIG. 3, the FREQ_WORD is funneled from the safety subsystem clock controller 110 to the ACMU 200 in the same manner as the subsystem clocks are funneled. In particular, funneling of FREQ_WORD may use the same MUX select values that are used for funneling the clocks. At any timeframe, the FREQ_WORD reaching the ACMU 200 corresponds to the clock that is selected by the ACMU 200 for monitoring. In various aspects of the present disclosure, each FREQ_WORD_MUX (e.g., 320, 350, 380) and each clock debug MUX (e.g., 120, 150, 190) share the same mux select lines to receive a multiplexer (MUX) select signal.

Figure 10:
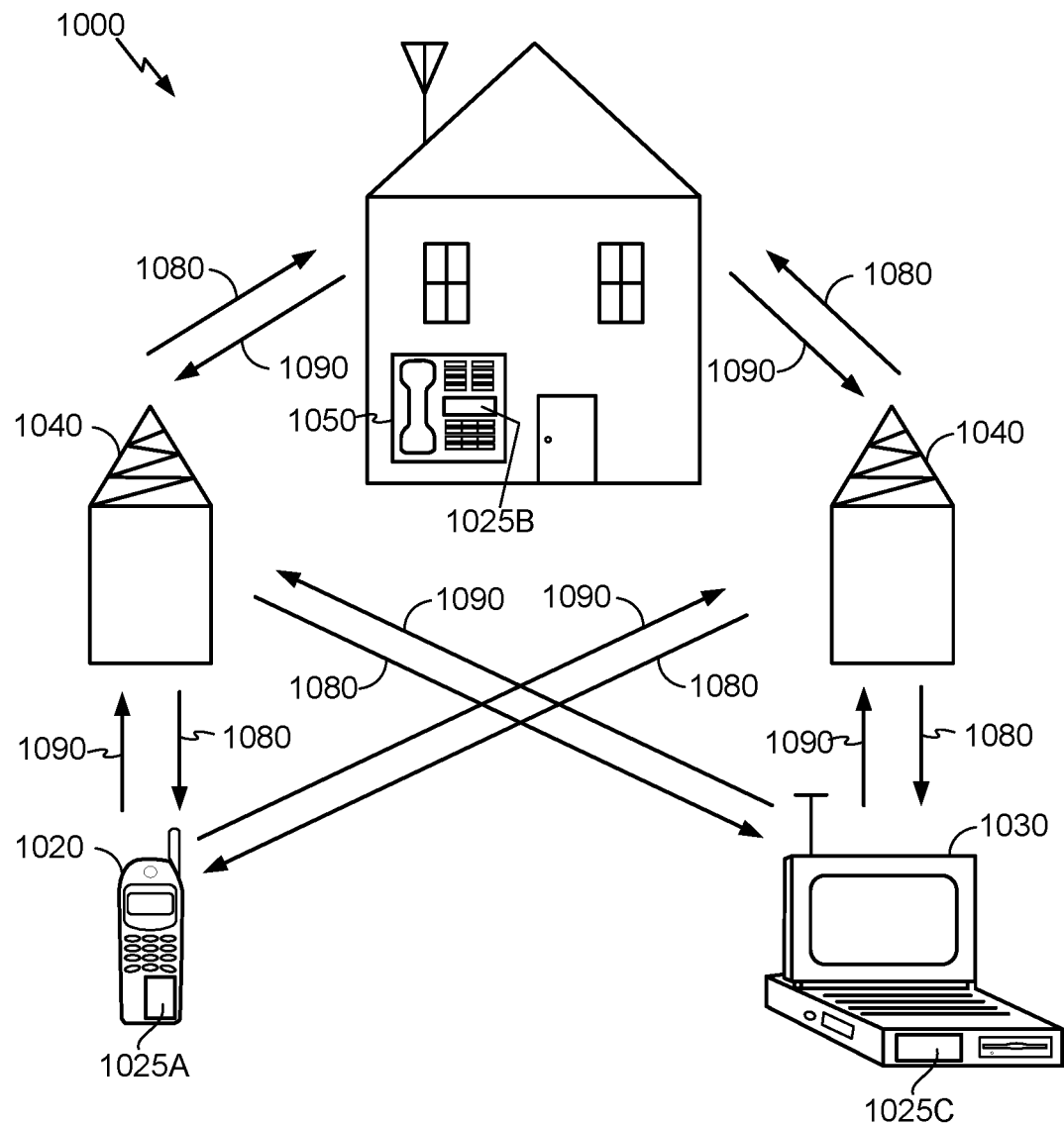
FIG. 10 is a block diagram showing an exemplary wireless communications system in which a configuration of the disclosure may be advantageously employed.

FIG. 10 is a block diagram showing an exemplary wireless communications system 1000 in which an aspect of the present disclosure may be advantageously employed. For purposes of illustration, FIG. 10 shows three remote units 1020, 1030, and 1050 and two base stations 1040. It will be recognized that wireless communications systems may have many more remote units and base stations. Remote units 1020, 1030, and 1050 include integrated circuit (IC) devices 1025A, 1025C, and 1025B that include the disclosed dynamic clock voltage scaling architecture. It will be recognized that other devices may also include the dynamic clock voltage scaling architecture, such as the base stations 1040, switching devices, and network equipment. FIG. 10 shows forward link signals 1080 from the base stations 1040 to the remote units 1020, 1030, and 1050, and reverse link signals 1090 from the remote units 1020, 1030, and 1050 to the base stations 1040.

In FIG. 10, remote unit 1020 is shown as a mobile telephone, remote unit 1030 is shown as a portable computer, and remote unit 1050 is shown as a fixed location remote unit in a wireless local loop system. For example, the remote units may be a mobile phone, a hand-held personal communication systems (PCS) unit, a portable data unit, such as a personal data assistant, a GPS enabled device, a navigation device, a set top box, a music player, a video player, an entertainment unit, a communications device, personal digital assistant (PDA), a fixed location data unit, such as meter reading equipment, or other device that stores or retrieves data or computer instructions, or combinations thereof. Although FIG. 10 illustrates remote units according to the aspects of the present disclosure, the present disclosure is not limited to these exemplary illustrated units. Aspects of the present disclosure may be suitably employed in many devices, which include the disclosed dynamic clock voltage scaling architecture.

Figure 11:
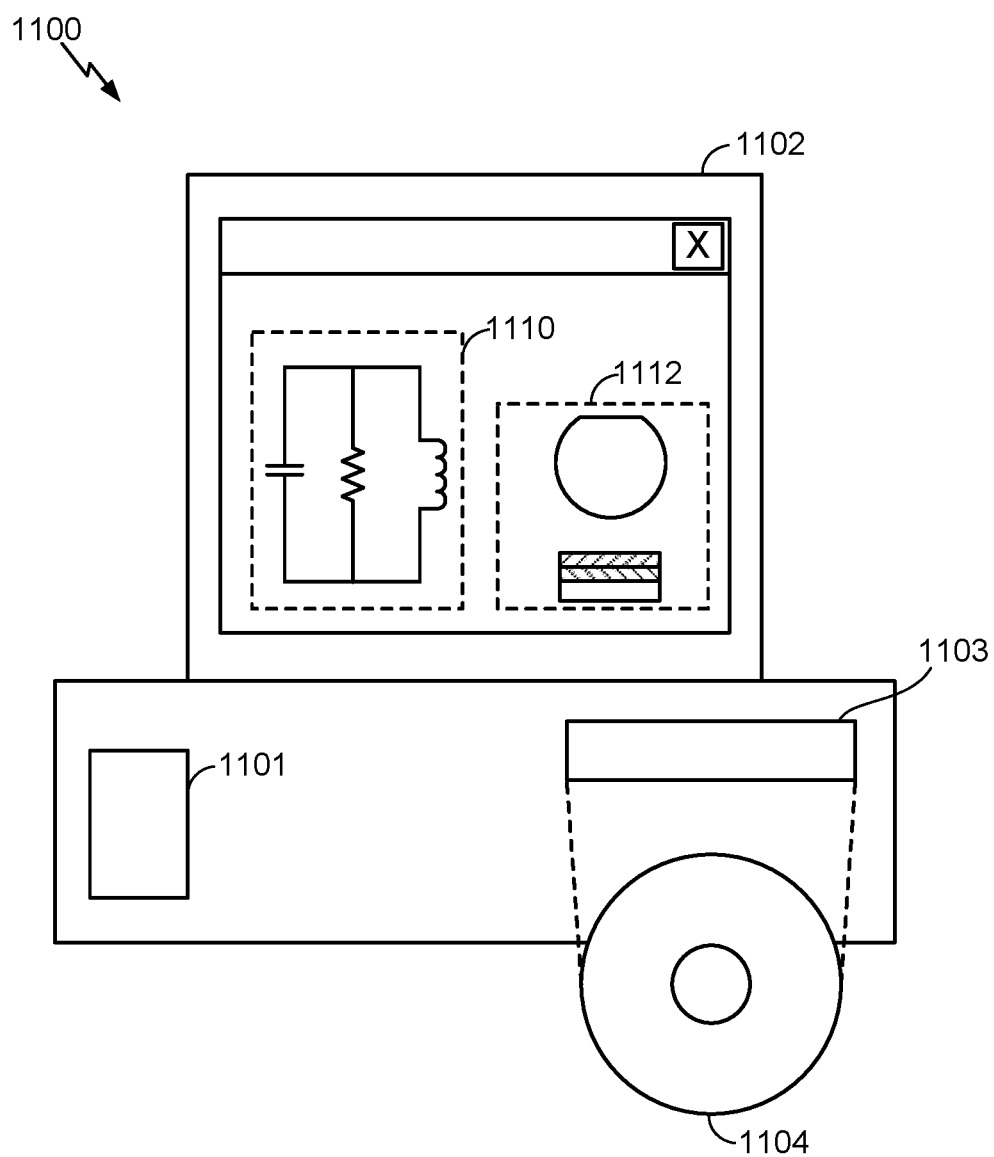
FIG. 11 is a block diagram illustrating a design workstation used for circuit, layout, and logic design of a semiconductor component according to one configuration.

FIG. 11 is a block diagram illustrating a design workstation used for circuit, layout, and logic design of a semiconductor component, such as the inductive device structure disclosed above. A design workstation 1100 includes a hard disk 1101 containing operating system software, support files, and design software such as Cadence or OrCAD. The design workstation 1100 also includes a display 1102 to facilitate design of a circuit 1110, such as a vehicle having a dynamic clock voltage scaling architecture. A storage medium 1104 is provided for tangibly storing the design of the circuit 1110 (e.g., the dynamic clock voltage scaling architecture). The design of the circuit 1110 or the DCVS component 1112 may be stored on the storage medium 1104 in a file format such as GDSII or GERBER. The storage medium 1104 may be a compact disc read-only memory (CD-ROM), digital versatile disc (DVD), hard disk, flash memory, or another appropriate device. Furthermore, the design workstation 1100 includes a drive apparatus 1103 for accepting input from or writing output to the storage medium 1104.

Data recorded on the storage medium 1104 may specify logic circuit configurations, pattern data for photolithography masks, or mask pattern data for serial write tools such as electron beam lithography. The data may further include logic verification data such as timing diagrams or net circuits associated with logic simulations. Providing data on the storage medium 1104 facilitates the design of the circuit 1110 or the DCVS component 1112 by decreasing the number of processes for designing semiconductor wafers.

Implementation examples are described in the following numbered clauses:

1. A method for a clock monitoring subsystem of a system-on-chip (SoC) supporting dynamic clock scaling and voltage gating, the method comprising:
   generating a set of clocks;
   routing a selected one of the set of clocks for frequency measurement through one or more clock routing subsystems;
   adjusting a frequency of the selected clock after the selected clock is routed through the clock routing subsystems; and
   communicating a sideband signal to indicate the adjusted frequency of the selected clock.
2. The method of clause 1, in which communicating the sideband signal comprises transmitting the sideband signal as a multiplexer (MUX) select signal.
3. The method of any of clauses 1 or 2, further comprising communicating the sideband signal to initiate clock gating.
4. The method of any of clauses 1-3, in which communicating the sideband signal comprises: generating a frequency word to encode the adjusted frequency; and transmitting the frequency word as a multiplexer (MUX) select signal.
5. The method of clause 4, in which generating the frequency word comprises:
   setting a frequency field of the frequency word to a specified adjusted clock frequency level; and
   setting an invalidity bit of the frequency word to invalid for discontinuing clock monitoring.
6. The method of any of clauses 1-5, in which adjusting the frequency comprises:
   initiating, by subsystem software drivers, a frequency change; and
   performing, by the subsystem software drivers, a check that monitors whether the frequency change is complete.
7. The method of clause 6, further comprising clearing, by the subsystem software drivers, an invalidity bit of a frequency word to resume clock monitoring after the frequency change is complete.
8. The method of any of clauses 1-7, further comprising:
   generating a set of reference clocks, wherein determining the frequency of the selected clock is based on a selected one of the set of reference clocks; and
   determining a frequency of a selected one of the set of reference clocks based on another one of the set of reference clocks.

9. The method of any of clauses 1-9, further comprising communicating the sideband signal to reset the adjusted frequency of the selected clock.

10. A non-transitory computer-readable medium having program code recorded thereon for a clock monitoring subsystem of a system-on-chip (SoC) supporting dynamic clock scaling and voltage gating, the program code being executed by a processor and comprising:
program code to generate a set of clocks;
program code to route a selected one of the set of clocks for frequency measurement through one or more clock routing subsystems;
program code to adjust a frequency of the selected clock after the selected clock is routed through the clock routing subsystems; and
program code to communicate a sideband signal to indicate the adjusted frequency of the selected clock.

11. The non-transitory computer-readable medium of clause 10, in which the program code to communicate the sideband signal comprises transmitting the sideband signal as a multiplexer (MUX) select signal.

12. The non-transitory computer-readable medium of any of clauses 10 or 11, further comprising program code to communicate the sideband signal to initiate clock gating.

13. The non-transitory computer-readable medium of any of clauses 10-12, in which the program code to communicate the sideband signal comprises:
generating a frequency word to encode the adjusted frequency; and
transmitting the frequency word as a multiplexer (MUX) select signal.

14. The non-transitory computer-readable medium of clause 13, in which the program code to generate the frequency word comprises:
program code to set a frequency field of the frequency word to a specified adjusted clock frequency level; and
program code to set an invalidity bit of the frequency word to invalid for discontinuing clock monitoring.

15. The non-transitory computer-readable medium of any of clauses 10-14, in which the program code to adjust the frequency comprises:
program code to initiate, by subsystem software drivers, a frequency change;
program code to perform, by the subsystem software drivers, a check that monitors whether the frequency change is complete; and
program code to clear, by the subsystem software drivers, an invalidity bit of a frequency word to resume clock monitoring after the frequency change is complete.

16. The non-transitory computer-readable medium of any of clauses 10-15, further comprising:
program code to generate a set of reference clocks, wherein determining the frequency of the selected clock is based on a selected one of the set of reference clocks; and
program code to determine a frequency of a selected one of the set of reference clocks based on another one of the set of reference clocks.

17. A vehicle system, comprising:
a vehicle control subsystem;
a set of one or more digital signal processing cores coupled to the vehicle control subsystem,
a set of clock generators to generate a set of clocks, in which the set of clock generators are coupled to the set of one or more digital signal processing cores;
one or more clock routing subsystems in which a selected one of the set of clocks is routed for frequency measurement; and
a clock monitoring unit to adjust a frequency of the selected clock after the selected clock is routed through the clock routing subsystems and to communicate a sideband signal to indicate the adjusted frequency of the selected clock.

18. The system of clause 17, in which the clock monitoring unit comprises:
a clock monitor state machine (CMSM); and
a frequency measurement unit (FMU) is configured to process the selected clock to measure a frequency of the selected clock based on the selected reference clock, and to generate a value indicative of such frequency at a frequency measurement output coupled to an input of the CMSM.

19. The system of any of clauses 17 or 18, in which the clock monitoring unit is further to transmit the sideband signal as a multiplexer (MUX) select signal.

20. The system of any of clauses 17-19, in which in which the clock monitoring unit is further to generate a frequency word to encode the adjusted frequency, and to transmit the frequency word as a multiplexer (MUX) select signal.

For a firmware and/or software implementation, the methodologies may be implemented with modules (e.g., procedures, functions, and so on) that perform the functions described herein. A machine-readable medium tangibly embodying instructions may be used in implementing the methodologies described herein. For example, software codes may be stored in a memory and executed by a processor unit. Memory may be implemented within the processor unit or external to the processor unit. As used herein, the term "memory" refers to types of long term, short term, volatile, nonvolatile, or other memory and is not limited to a particular type of memory or number of memories, or type of media upon which memory is stored.

If implemented in firmware and/or software, the functions may be stored as one or more instructions or code on a non-transitory computer-readable medium. Examples include computer-readable media encoded with a data structure and computer-readable media encoded with a computer program. Computer-readable media includes physical computer storage media. A storage medium may be an available medium that can be accessed by a computer. By way of example, and not limitation, such computer-readable media can include random access memory (RAM), read-only memory (ROM), electrically erasable programmable read-only memory (EEPROM), compact disc read-only memory (CD-ROM) or other optical disk storage, magnetic disk storage or other magnetic storage devices, or other medium that can be used to store desired program code in the form of instructions or data structures and that can be accessed by a computer. Disk and disc, as used herein, include compact disc (CD), laser disc, optical disc, digital versatile disc (DVD), floppy disk and Blu-ray® disc, where disks usually reproduce data magnetically, while discs reproduce data optically with lasers. Combinations of the above should also be included within the scope of computer-readable media.

In addition to storage on computer-readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Although the present disclosure and its advantages have been described in detail, it should be understood that various changes, substitutions, and alterations can be made herein without departing from the technology of the disclosure as defined by the appended claims. For example, relational terms, such as "above" and "below" are used with respect to a substrate or electronic device. Of course, if the substrate or electronic device is inverted, above becomes below, and vice versa. Additionally, if oriented sideways, above, and below may refer to sides of a substrate or electronic device. Moreover, the scope of the present application is not intended to be limited to the particular configurations of the process, machine, manufacture, composition of matter, means, methods, and steps described in the specification. As one of ordinary skill in the art will readily appreciate from the disclosure, processes, machines, manufacture, compositions of matter, means, methods, or steps, presently existing or later to be developed that perform substantially the same function, or achieve substantially the same result as the corresponding configurations described herein, may be utilized according to the present disclosure. Accordingly, the appended claims are intended to include within their scope such processes, machines, manufacture, compositions of matter, means, methods, or steps.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in random access memory (RAM), flash memory, read-only memory (ROM), erasable programmable read-only memory (EPROM), electrically erasable programmable read-only memory (EEPROM), registers, hard disk, a removable disk, a compact disc read-only memory (CD-ROM), or any other form of storage medium known in the art. An exemplary storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general-purpose or special-purpose computer. By way of example, and not limitation, such computer-readable media can include random access memory (RAM), read-only memory (ROM), electrically erasable programmable read-only memory (EEPROM), compact disc read-only memory (CD-ROM) or other optical disk storage, magnetic disk storage or other magnetic storage devices, or any other medium that can be used to carry or store specified program code means in the form of instructions or data structures and that can be accessed by a general-purpose or special-purpose computer, or a general-purpose or special-purpose processor. In addition, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc, where disks usually reproduce data magnetically, while discs reproduce data optically with lasers. Combinations of the above should also be included within the scope of computer-readable media.

The previous description of the present disclosure is provided to enable any person skilled in the art to make or use the disclosure. Various modifications to the present disclosure will be readily apparent to those skilled in the art, and the generic principles defined herein may be applied to other variations without departing from the spirit or scope of the disclosure. Thus, the present disclosure is not intended to be limited to the examples and designs described herein but is to be accorded the widest scope consistent with the principles and novel features disclosed herein.

What is claimed:

1. A method for a clock monitoring subsystem of a system-on-chip (SoC) supporting dynamic clock scaling and voltage gating, the method comprising:
   generating a set of clocks;
   routing a selected one of the set of clocks for frequency measurement through one or more clock routing subsystems;
   adjusting a frequency of the selected clock after the selected clock is routed through the clock routing subsystems;

generating a frequency word to encode the adjusted frequency; and communicating the frequency word through a digital frequency scaling (DFS) interface as a sideband signal to indicate the adjusted frequency of the selected clock.

2. The method of claim 1, in which communicating the frequency word comprises selecting the frequency word using a multiplexer (MUX) select signal corresponding to the selected clock.

3. The method of claim 1, further comprising communicating the sideband signal to initiate clock gating.

4. The method of claim 1, in which generating the frequency word comprises:
setting a frequency field of the frequency word to a specified adjusted clock frequency level; and
setting an invalidity bit of the frequency word to invalid for discontinuing clock monitoring.

5. The method of claim 1, in which adjusting the frequency comprises:
initiating, by subsystem software drivers, a frequency change; and
performing, by the subsystem software drivers, a check that monitors whether the frequency change is complete.

6. The method of claim 1, further comprising:
generating a set of reference clocks, wherein determining the frequency of the selected clock is based on a selected one of the set of reference clocks; and
determining a frequency of a selected one of the set of reference clocks based on another one of the set of reference clocks.

7. The method of claim 1, further comprising communicating the sideband signal to reset the adjusted frequency of the selected clock.

8. The method of claim 5, further comprising clearing, by the subsystem software drivers, an invalidity bit of the frequency word to resume clock monitoring after the frequency change is complete.

9. A non-transitory computer-readable medium having program code recorded thereon for a clock monitoring subsystem of a system-on-chip (SoC) supporting dynamic clock scaling and voltage gating, the program code being executed by a processor and comprising:
program code to generate a set of clocks;
program code to route a selected one of the set of clocks for frequency measurement through one or more clock routing subsystems;
program code to adjust a frequency of the selected clock after the selected clock is routed through the clock routing subsystems;
program code to generate a frequency word to encode the adjusted frequency; and
program code to communicate the frequency word through a digital frequency scaling (DFS) interface as a sideband signal to indicate the adjusted frequency of the selected clock.

10. The non-transitory computer-readable medium of claim 9, in which the program code to communicate the frequency word comprises program code to select the frequency word using a multiplexer (MUX) select signal corresponding to the selected clock.

11. The non-transitory computer-readable medium of claim 9, further comprising program code to communicate the sideband signal to initiate clock gating.

12. The non-transitory computer-readable medium of claim 9, in which the program code to generate the frequency word comprises:
program code to set a frequency field of the frequency word to a specified adjusted clock frequency level; and
program code to set an invalidity bit of the frequency word to invalid for discontinuing clock monitoring.

13. The non-transitory computer-readable medium of claim 9, in which the program code to adjust the frequency comprises:
program code to initiate, by subsystem software drivers, a frequency change;
program code to perform, by the subsystem software drivers, a check that monitors whether the frequency change is complete; and
program code to clear, by the subsystem software drivers, an invalidity bit of the frequency word to resume clock monitoring after the frequency change is complete.

14. The non-transitory computer-readable medium of claim 9, further comprising:
program code to generate a set of reference clocks, wherein determining the frequency of the selected clock is based on a selected one of the set of reference clocks; and
program code to determine a frequency of a selected one of the set of reference clocks based on another one of the set of reference clocks.

15. A vehicle system, comprising:
a vehicle control subsystem;
a set of one or more digital signal processing cores coupled to the vehicle control subsystem,
a set of clock generators to generate a set of clocks, in which the set of clock generators are coupled to the set of one or more digital signal processing cores;
one or more clock routing subsystems in which a selected one of the set of clocks is routed for frequency measurement; and
a clock monitoring unit to adjust a frequency of the selected clock after the selected clock is routed through the clock routing subsystems, to generate a frequency word to encode the adjusted frequency, and to communicate the frequency word through a digital frequency scaling (DFS) interface as a sideband signal to indicate the adjusted frequency of the selected clock.

16. The system of claim 15, in which the clock monitoring unit comprises:
a clock monitor state machine (CMSM); and
a frequency measurement unit (FMU) is configured to process the selected clock to measure a frequency of the selected clock based on the selected reference clock, and to generate a value indicative of such frequency at a frequency measurement output coupled to an input of the CMSM.

17. The system of claim 15, in which the clock monitoring unit is further configured to select the frequency word using a multiplexer (MUX) select signal corresponding to the selected clock.

* * * * *